United States Patent
Lortie et al.

(10) Patent No.: US 12,455,621 B1
(45) Date of Patent: Oct. 28, 2025

(54) OPTIMIZATIONS IN ASSOCIATING USER GAZE WITH USER INTERFACE ELEMENTS

(71) Applicant: Apple Inc., Cupertino, CA (US)

(72) Inventors: Chase B Lortie, San Francisco, CA (US); David J Meyer, Menlo Park, CA (US); Paul A Lacey, Davie, FL (US); Julian K Shutzberg, San Francisco, CA (US); Ali Ercan, San Jose, CA (US); Wei-Kang Hsu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/679,790

(22) Filed: May 31, 2024

Related U.S. Application Data

(60) Provisional application No. 63/470,623, filed on Jun. 2, 2023.

(51) Int. Cl.
*G06F 3/01* (2006.01)
*G06F 3/0482* (2013.01)

(52) U.S. Cl.
CPC .............. *G06F 3/013* (2013.01); *G06F 3/017* (2013.01); *G06F 3/0482* (2013.01)

(58) Field of Classification Search
CPC ......... G06F 3/013; G06F 3/017; G06F 3/0482
USPC ....................................................... 345/156
See application file for complete search history.

(56) References Cited

U.S. PATENT DOCUMENTS

| | | | |
|---|---|---|---|
| 2014/0247208 A1* | 9/2014 | Henderek | G06F 3/017 345/156 |
| 2015/0338915 A1* | 11/2015 | Publicover | H04W 12/065 345/633 |
| 2021/0096726 A1* | 4/2021 | Faulkner | G06F 3/04842 |

\* cited by examiner

*Primary Examiner* — Mark Edwards
(74) *Attorney, Agent, or Firm* — Thompson Hine LLP

(57) ABSTRACT

Various implementations assess user interactions to trigger user interface responses. Some implementations associate user gaze with user interface elements using one or more criteria that enable interpreting the user's gaze in ways that are consistent with user intentions and/or expectations. In some implementations, a user's gaze is associated with a user interface element when the user gazes at the user interface element. When the gaze leaves the user interface element (e.g., intentionally or unintentionally), the association may be maintained or discontinued using one or more criteria to be consistent with user intentions and/or expectations. In some implementations, this involves determining whether to continue associating a user's gaze with a user interface element so that the gaze-to-element association is maintained in certain circumstances (e.g., blinks and saccades) but discontinued in other circumstances (e.g., when the user is fixating outside of a zone around the element for more than a threshold time/number of frames).

20 Claims, 12 Drawing Sheets

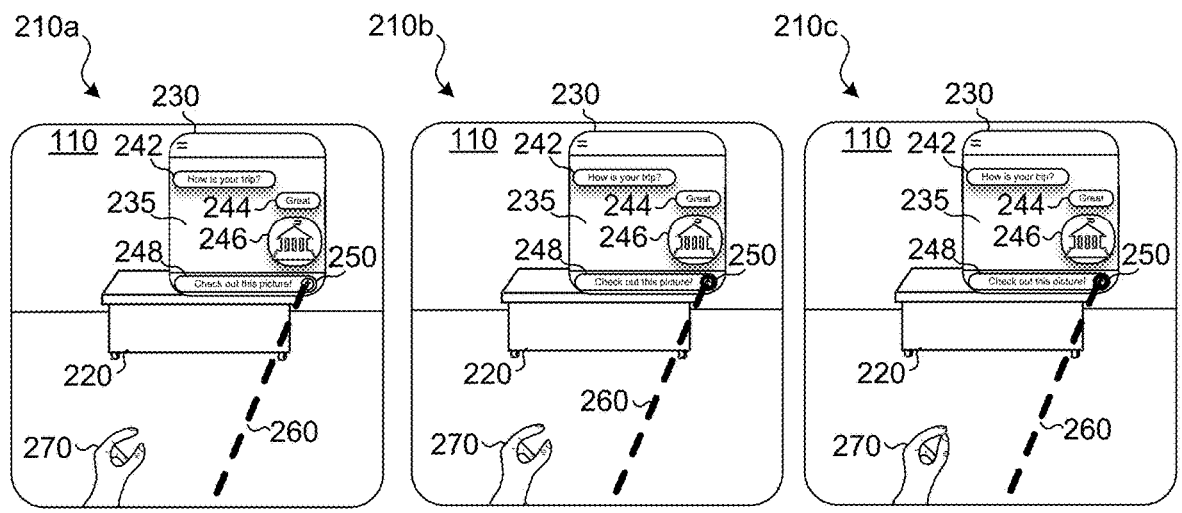
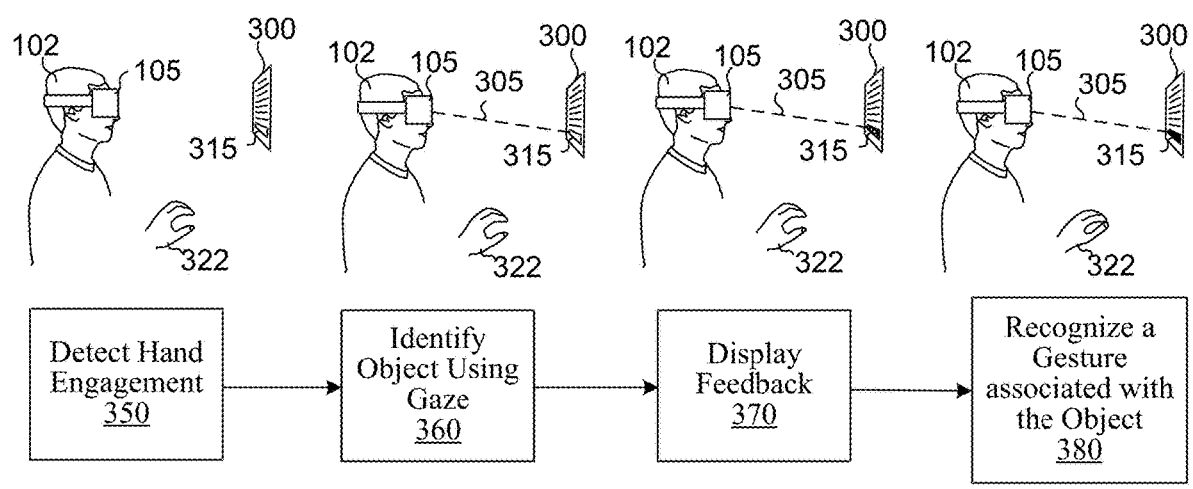
FIG. 2
FIG. 3

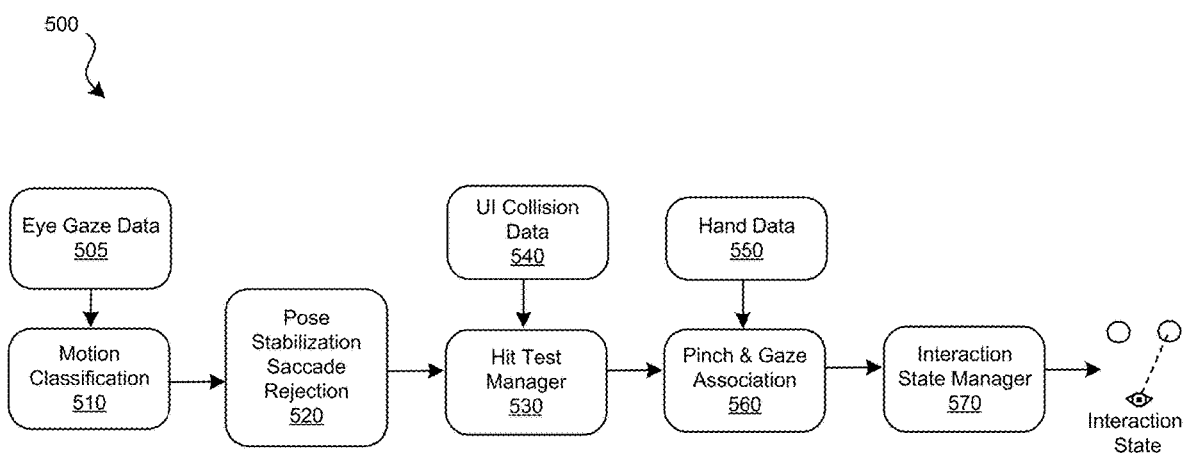
FIG. 5
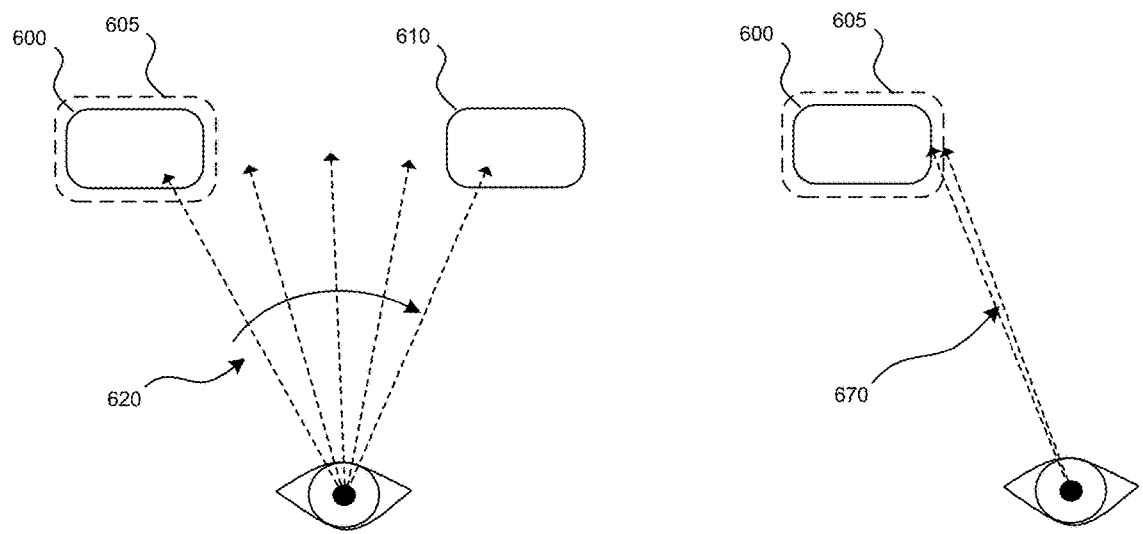
FIG. 6A　　　　　FIG. 6B

OPTIMIZATIONS IN ASSOCIATING USER GAZE WITH USER INTERFACE ELEMENTS

CROSS-REFERENCE TO RELATED APPLICATIONS

This Application claims the benefit of U.S. Provisional Application Ser. No. 63/470,623 filed Jun. 2, 2023, which is incorporated herein in its entirety.

TECHNICAL FIELD

The present disclosure generally relates to assessing user interactions with electronic devices that involve gaze-based and other types of user activities.

BACKGROUND

Existing user interaction systems may be improved with respect to facilitating interactions based on gaze and other types of user activities.

SUMMARY

Various implementations disclosed herein include devices, systems, and methods that assess user interactions to trigger user interface responses. Some implementations associate a user's gaze with one or more user interface elements using one or more criteria that enable interpreting the user's gaze in ways that are consistent with user intentions and/or expectations. In some implementations, a user's gaze is associated with a user interface element when the user gazes at the user interface element. When the user looks away from the user interface element (e.g., intentionally or unintentionally), the association may be maintained or discontinued using one or more criteria to be consistent with user intentions and/or expectations. In some implementations, this involves determining whether to continue associating a user's gaze with a user interface element so that the gaze-to-element association is maintained in certain circumstances (e.g., during blinks and saccades) but discontinued in other circumstances (e.g., when the user is fixating outside of a zone around the element for more than a threshold time/number of frames). Some implementations enable gaze-based feedback (e.g., hover effects) to be displayed without flickering on blinks/saccades while also ending relatively quickly when the user intentionally looks away from the user interface element.

In some implementations, a method is performed at an electronic device by a processor executing instructions stored on a non-transitory computer-readable medium. The device may include or utilize one or more sensors. The method obtains gaze data regarding a gaze. Such gaze data may be generated based on sensor data of an eye captured by the one or more sensors. The method generates an association between the gaze and a user interface element. This association may be based on an initial or current determination that the gaze is directed at or near the user interface element. Gaze-based feedback may be displayed based on the association, for example, initiating a hover feedback response and/or a menu expansion feedback response.

The method detects that the gaze is outside of a region associated with the user interface element. Such a move of the gaze to be outside the region associated with the user interface element may occur unintentionally (e.g., during blinks and unintentional saccades) or intentionally (e.g., as the user begins shifting their gaze towards another user interface element). To account for the possibility that the user is not intentionally looking away from the user interface element, the method initially maintains the association between the gaze and the user interface element when the gaze is detected outside of the region associated with the user interface element.

However, the method discontinues the association between the gaze and the user interface element based on determining that a criterion is satisfied by the gaze detected outside of the region. In some implementations, this involves determining whether the gaze has left a region associated with the user interface element (e.g., the element's effective expanded target bounds) for more than a threshold number (e.g., 1, 2, 3, 4, 5, 6, etc.) of frames. The criteria may be selected to distinguish between unintentional gaze shifts and intentional gaze shifts. For example, the user having looking away from the region associated with the user interface element for more than a threshold amount of time (e.g., number of frames) may be indicative of intentional behavior.

In some implementations, feedback is provided based on a gaze-to-element association, e.g., providing hover feedback highlighting the element or expanding a menu associated with the element. In such cases, such feedback is discontinued when the association is discontinued. Thus, even before a gaze is associated with a new target user interface element, the hover feedback or menu expanded for the last gazed-upon element may conclude.

Determining that a criterion is satisfied by the gaze detected outside of the region may involve various time-based or space-based factors. The method may repeat a criterion-based evaluation periodically, e.g., on every frame, every other frame, every $5^{th}$ frame, etc. of content display. Determining that the criterion is satisfied may involve, on every frame that a gaze is associated with a user interface element (e.g., considered locked onto that element), determining whether the user's currently measured gaze is within a region associated with the user interface element. This may involve computing an angular distance from the current gaze direction and a closest point on the user interface element and determining whether that distance is within a threshold, e.g., within a maximum error/fuzziness threshold. If the angular distance for the current gaze direction (e.g., the current frame) is more than the threshold (e.g., the user's gaze is off target), a break timer/counter may be incremented. The break timer/counter may be reset if the gaze comes back within the target bounds before the timer/counter hits a threshold, e.g., expires. However, if the gaze remains outside for more than the threshold time/number of frames (e.g., the timer expires after 5 frames), then the criterion may be considered to be satisfied and the association between the gaze and the target user interface user element may be discontinued. In these examples, the association is maintained until the gaze is outside of a region associated with the target for at least a certain amount of time/number of frames to prevent blinks or other anomalies from causing the discontinuation of an association and/or any change in feedback that would be triggered thereby. This may reduce flickering of the gaze-based feedback that might otherwise occur in which, for example, hover feedback is turned off and back on when the user blinks or quickly glances away and back at a target user interface element.

Other implementations described herein provide fast fixation rejection techniques and techniques that enable exceptions to fast fixation rejection techniques. A fast fixation rejection technique may be used to suppress the formation of gaze-to-element associations after certain gaze events (e.g., large saccades). For example, after detecting a large saccade, a system or method may suppress the formation of a new gaze-to-element association based on the assumption that it may take a small amount of time for the user's gaze to settle on an intended target after a large saccade. However, such a fast fixation rejection technique may be undesirable in some circumstances, such as where a user, who is very familiar with a user interface, attempts to quickly provide a series of inputs using the user interface. As a specific example, such a user may attempt to use a gaze plus pinch input mechanism to quickly select letters on a virtual keyboard of separate letter buttons or to quickly select numbers on a virtual number pad of separate number buttons. Some implementations detect such circumstances in which a fast fixation rejection technique might otherwise prevent recognition of the input and, in response, disable the fast fixation rejection technique and enable the desired interactions. For example, the fast-fixation-based suppression of gaze-to-element association following a long saccade may be disabled in the circumstance of certain types of user activity (e.g., a sequential set of intentional and quick pinches) to enable fast gaze-pinch based user interface interactions, such as typing or entering a passcode.

In some implementations, a method is performed at an electronic device by a processor executing instructions stored on a non-transitory computer-readable medium. The device may include or utilize one or more sensors. The method obtains gaze data regarding a gaze. The gaze data may be generated based on sensor data of an eye captured by the one or more sensors. The method detects a gaze event having a characteristic. For example, the method may detect a large saccade occurring when a user's gaze quickly moves from looking at the "A" key to the "F" key of a virtual keyboard. Based on detecting the gaze event, the method suppresses the association of the gaze with a user interface element for a period following the gaze event. For example, a fast fixation rejection technique may be configured to suppress associating the gaze with a new element following large saccades during a short time window.

The method detects a user activity separate from the gaze during the period, where the user activity corresponds to an interaction with the user interface element. For example, the method may detect a hand gesture such as a pinch, a verbal command, or a touch on a touch screen input device. Based on detecting the user activity, the method initiates the interaction with the user interface element (e.g., selecting the "F" key) based on associating the gaze with the user interface element. In this way, the method may effectively break through the fast fixation suppression period. A user may be enabled to quickly enter text such as a password using a gaze plus input modality in a way that may be faster than would otherwise be allowed given the use of a fast fixation rejection technique. Users may be enabled to gaze and select a series of targets without waiting for hover feedback. Users may be enabled to make fast gaze movements and roughly associated pinches (e.g., made just before or just after the gaze direction hits its intended target).

Other implementations described herein provide target refinement. In some circumstances, an initially identified gazed-upon UI target may not be the target intended by the user for an interaction. For example, a user may attempt a pinch and gaze interaction and the user's gaze may not have quite reached the intended target when the user pinches. In another example, the gaze during a pinch and gaze interaction may be detected, due to error in the gaze tracking system, to be slightly outside of an intended target. An initial target error may become more evident over time, e.g., as the user's gaze moves to the intended target, as subsequent hand movement is determined to be application for the initial target's type or not, etc.

In some implementations, a method is performed at an electronic device by a processor executing instructions stored on a non-transitory computer-readable medium. The device may include or utilize one or more sensors. The method involves identifying a user activity (e.g., a user making a pinch by touching a finger and a thumb together) based on sensor data capture by the one or more sensors. The user activity may be a type of activity associated with a start of a first user interaction (e.g., pinch-release to select) and a start of a second user interaction (e.g., pinch-drag to scroll). Based on identifying the user activity, the method identifies a first target within a user interface within an XR environment to associate with the user activity based on a gaze. The gaze may be identified based on sensor data of an eye captured by the one or more sensors. In one example, the method determines what element the user is looking at when a pinch make event is detected. The method determines whether to retarget the user activity by associating the user activity with a second target instead of the first target, where determining whether to retarget is based on a first criterion, e.g., applying a temporal mitigation, applying a spatial mitigation, etc.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2 illustrates the user making a pinching gesture while changing gaze direction relative to content presented in views of an XR environment provided by the device 110 of FIG. 1, in accordance with some implementations.

FIG. 3 illustrates a user interaction based on gaze and hand gesture user activity, in accordance with some implementations.

FIG. 5 illustrates an exemplary interaction tracking flow in accordance with some implementations.

FIG. 6A-B illustrate maintaining and then discontinuing a gaze-to-element association as a user looks away from an element, in accordance with some implementations.

Figure 1A:
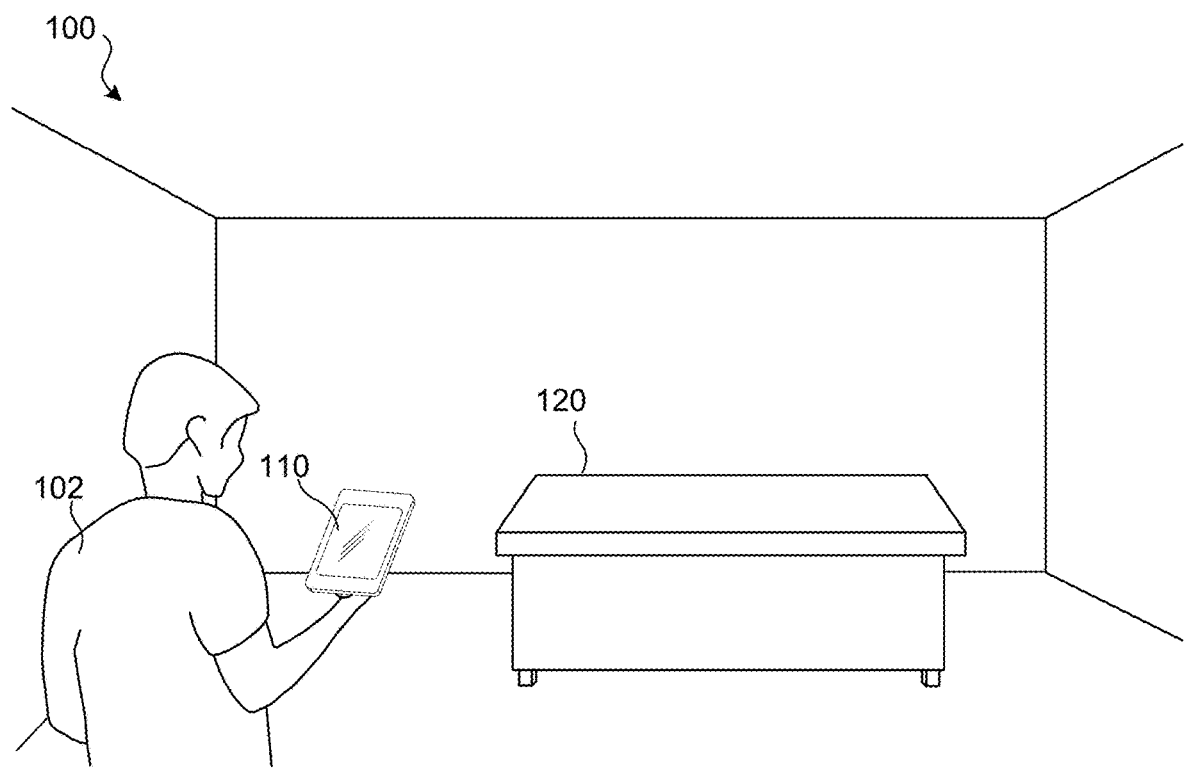
FIGS. 1A-B illustrate exemplary electronic devices operating in physical environments in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
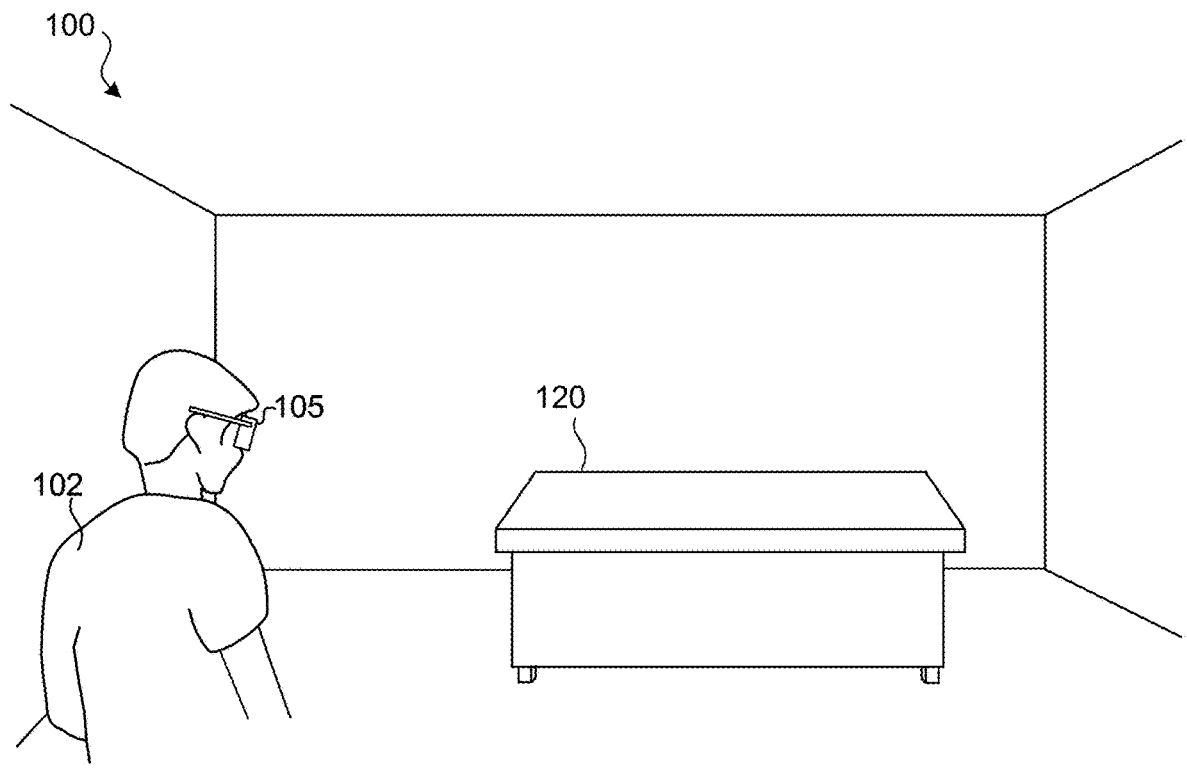

FIGS. 1A-B illustrate exemplary electronic devices 105 and 110 operating in a physical environment 100. In the example of FIGS. 1A-1B, the physical environment 100 is a room that includes a desk 120. The electronic devices 105 and 110 may include one or more cameras, microphones, depth sensors, or other sensors that can be used to capture information about and evaluate the physical environment 100 and the objects within it, as well as information about the user 102 of electronic devices 105 and 110. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic devices 105 (e.g., a wearable device such as an HMD) and/or 110 (e.g., a handheld device such as a mobile device, a tablet computing device, a laptop computer, etc.). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system (i.e., a 3D space) associated with the XR environment, which may correspond to a 3D coordinate system of the physical environment 100.

In some implementations, video (e.g., pass-through video depicting a physical environment) is received from an image sensor of a device (e.g., device 105 or device 110). In some implementations, a 3D representation of a virtual environment is aligned with a 3D coordinate system of the physical environment. A sizing of the 3D representation of the virtual environment may be generated based on, inter alia, a scale of the physical environment or a positioning of an open space, floor, wall, etc. such that the 3D representation is configured to align with corresponding features of the physical environment. In some implementations, a viewpoint within the 3D coordinate system may be determined based on a position of the electronic device within the physical environment. The viewpoint may be determined based on, inter alia, image data, depth sensor data, motion sensor data, etc., which may be retrieved via a virtual inertial odometry system (VIO), a simultaneous localization and mapping (SLAM) system, etc.

FIG. 2 illustrates the user 102 making a pinching hand gesture while changing gaze direction relative to content presented in views 210a-c of an XR environment provided by the device 110 of FIG. 1. The views 210a-c include an exemplary user interface 230 of an application and a depiction 220 of the table 120. Providing such a view may involve determining 3D attributes of the physical environment 100 and positioning virtual content, e.g., user interface 230, in a 3D coordinate system corresponding to that physical environment 100.

In the example of FIG. 2, the user interface 230 include various content items, including a background portion 235, message bubble portions, 242, 244, 246, and a new message entry portion 248 with button 250. The message bubble portions 242, 244, 246 may be displayed on the flat user interface 230 with 3D effects in the view provided by device 110. The user interface 230 may be a user interface of a text messaging application, as illustrated in this example. The user interface 230 is simplified for purposes of illustration and user interfaces in practice may include any degree of complexity, any number of content items, and/or combinations of 2D and/or 3D content. The user interface 230 may be provided by operating systems and/or applications of various types including, but not limited to, messaging applications, web browser applications, content viewing applications, content creation and editing applications, or any other applications that can display, present, or otherwise use visual and/or audio content.

In this example, the user interface 230 is provided in a way that combines 2D flat portions and 3D effects to provide functional and aesthetic benefits. In this example, the background portion 235 of the user interface 230 is flat. In this example, the background portion 235 includes all aspects of the user interface 230 being displayed except for the message bubbles 242, 244, 246 and new message entry portion 248 with button 250. Displaying a background portion of a user interface of an operating system or application as a flat surface may provide various advantages. Doing so may provide an easy to understand or otherwise use portion of an XR environment for accessing the user interface of the application. In some implementations, multiple user interfaces (e.g., corresponding to multiple, different applications) are presented sequentially and/or simultaneously within an XR environment using flat background portions.

In some implementations, the positions and/or orientations of such one or more user interfaces are determined to facilitate visibility and/or use. The one or more user interfaces may be at fixed positions and orientations within the 3D environment. In such cases, user movements would not affect the position or orientation of the user interfaces within the 3D environment.

In other implementations, the one or more user interfaces may be body-locked content, e.g., having a distance and orientation offset relative to a portion of the user's body (e.g., their torso). For example, the body-locked content of a user interface could be 2 meters away and 45 degrees to the left of the user's torso's forward-facing vector. If the user's head turns while the torso remains static, a body-locked user interface would appear to remain stationary in the 3D environment at 2 m away and 45 degrees to the left of the torso's front facing vector. However, if the user does rotate their torso (e.g., by spinning around in their chair), the body-locked user interface would follow the torso rotation and be repositioned within the 3D environment such that it is still 2 m away and 45 degrees to the left of their torso's new forward-facing vector.

In other implementations, user interface content is defined at a specific distance from the user with the orientation relative to the user remaining static (e.g., if initially displayed in a cardinal direction, it will remain in that cardinal direction regardless of any head or body movement). In this example, the orientation of the body-locked content would not be referenced to any part of the user's body. In this different implementation, the body-locked user interface would not reposition itself in accordance with the torso rotation. For example, body-locked user interface may be defined to be 2 m away and, based on the direction the user is currently facing, may be initially displayed north of the user. If the user rotates their torso 180 degrees to face south, the body-locked user interface would remain 2 m away to the north of the user, which is now directly behind the user.

A body-locked user interface could also be configured to always remain gravity or horizon aligned, such that head and/or body changes in the roll orientation would not cause the body-locked user interface to move within the 3D environment. Translational movement would cause the body-locked content to be repositioned within the 3D environment in order to maintain the distance offset.

The views 210*a*-*c* illustrate the user's gaze 260 and hand 270 gesturing occurring at successive points in time, e.g., view 210*a* corresponds to a first instant in time, view 210*b* corresponds to a second instant in time after the first instant in time, and view 210*c* corresponds to a third instant in time after the second instant in time. In this example, the user intends to provide user input selecting button 250 by gazing at the button 250 (i.e., directing their gaze direction 260 at button 250) and making a pinching gesture with hand 270. The user understands that this type of input (e.g., gazing at a user interface object such as button 250 and making a pinching hand gesture) will be interpreted as input corresponding to the gazed-at user interface object.

In this example, the user first directs their gaze in gaze direction 260 at button 250 (as shown in view 210*b*). This user activity, i.e., gazing at button 250, may be recognized based on sensors on the device, e.g., based on eye sensors. Based on detecting this user activity, e.g., gaze at the button 250, a gaze-to-element association may be generated and appropriate feedback may be provided. For example, button 250 may be displayed with highlighting, a glow, or a hover indicator, or other visual feedback indicating that the gaze at the element has been recognized and/or is considered intentional.

While gazing at the button 250, the user pinches hand 270 (as shown in view 210*c*). This user activity, i.e., gazing at button 250 and pinching, may be recognized by sensors on the device, e.g., based on an inward facing eye sensor on an HMD and an outward facing sensor on the HMD capturing images of the hand. Based on detecting this user activity, e.g., gaze at the button 250 and a pinch, a gaze-to-element association may be generated or maintained and an action with the element initiated, e.g., a selection, click, etc. on the button 250 initiated. For example, selection of button 250 may initiate an action sending the text content of element 248 as a text message and resulting in corresponding changes to the displayed UI. In the example of FIG. 2, the user activity (e.g., a pinching hand gesture along with a gaze at a user interface element) corresponds to a user intention to interact with user interface element, i.e., the pinch signifies the intention to interact and the gaze (at the point in time of the pinch) identifies the user interface element as the target of the interaction.

FIG. 3 illustrates recognizing a user interaction based on gaze and hand gesture user activity. In this example, sensor data on a device 105 and/or user interface information are used to recognize a user interaction made by user 102, e.g., based on outward-facing image sensor data, depth sensor data, eye sensor data, motion sensor data, etc. and/or information made available by an application providing the user interface. Sensor data may be monitored to detect user activity corresponding to an engagement condition corresponding to the start of a user interaction.

In this example, at block 350, the process detects that the user 102 has positioned their hand 322 within view of outward facing image sensors. It may detect a particular hand configuration, e.g., a claw shape, a flat hand, a steady hand in any configuration, etc., as an indication of hand engagement or may simply detect the presence of the hand within sensor view.

At block 360, the process identifies an object using user gaze data. In this example, the process identifies that the gaze direction 305 of user 102 is on user interface element 315.

At block 370, the process displays feedback based on the object identified by the gaze. In this example, the feedback distinguishes user interface element 315 graphically to indicate that the user interface element 315 now has a different state (e.g., a "hover" state that is analogous to the state of a traditional user interface icon when a cursor is on the item without clicking/tapping). In this example, the application that provided the user interface information need not be notified of the hover state and associated feedback. Instead, the hand engagement, object identification via gaze, and display of feedback can be handled out of process (i.e., outside of the application process), e.g., by an operating system process. For example, such processes may be provided via an operating system's input support process. Doing so may reduce or minimize potentially sensitive user information (e.g., such as constant gaze direction vectors) that might otherwise be provided to an application to enable the application to handle these functions within the application process. Whether and how to display feedback may be specified by the application even though it is carried out of process. For example, the application may define that an element should display hover or highlight feedback and define how the hover or highlight will appear such that the out of process aspect (e.g., operating system) may provide the hover or highlight according to the defined appearance. Alternatively, feedback can be defined out-of-process (e.g., solely by the OS) or defined to use a default appearance/animation if the application does not specify an appearance.

At block 380, the process recognizes a gesture to be associated with the identified object. In this example, the user is gazing in gaze direction 305 at user interface object 315 while (or at least near in time) to a pinch gesture by hand 322. This pinch gesture, in this example, is interpreted to initiate an action upon the user interface object 315, e.g., causing a selection action that is analogous to a cursor "click" event of a traditional user interface icon during which a cursor is positioned on an icon and a trigger such as a mouse click or track pad tap is received or similarly analogous to a touch screen "tap" event.

Recognition of such an interaction may be based on functions performed both via a system process and via an application process. For example, an OS's input process may interpret hands and gaze data from the device's sensors to identify an interaction event and provide limited or interpreted/abstracted information about the interaction event to the application that provided the user interface 300. For example, rather than providing gaze direction information identifying gaze direction 305, the OS input support process may identify a 2D point within the 2D user interface 300 on the user interface element 315, e.g., an interaction pose. The application process can then interpret this 2D point information (e.g., interpreting it as a selection, mouse-click, touch-screen tap, or other input received at that point) and provide a response, e.g., modifying its user interface accordingly.

FIG. 3 illustrates examples of recognizing user interactions that involve at least some user gaze activity. In the example, the user activity involved gaze and hand gesture user activity. However, numerous other types of user activities can be recognized, e.g., based on one or more user actions identifying a user interface element and/or one or more user actions providing input (e.g., no-action/hover type input, selection type input, input having a direction, path, speed, acceleration, etc.). Input in 3D space that is analogous to input on 2D interfaces may be recognized, e.g., input analogous to mouse movements, mouse button clicks, touch screen touch events, trackpad events, joystick events, game controller events, etc.

Some implementations utilize an out of process (i.e., outside of an application process) input support framework to facilitate accurate, consistent, and efficient input recognition in a way that preserves private user information. For example, aspects of the input recognition process may be performed out of process such that applications have little or no access to information about where a user is looking, e.g., gaze directions. In some implementations, application access to some user activity information (e.g., gaze direction-based data) is limited to only a particular type of user activity, e.g., activity satisfying particular criteria. For example, applications may be limited to receive only information associated with deliberate or intentional user activity, e.g., deliberate or intentional actions indicative of an intention to interact with (e.g., select, activate, move, etc.) a user interface element.

Some implementations recognize input using functional elements performed both via an application process and a system process that is outside of the application process. Thus, in contrast to a framework in which all (or most) input recognition functions are managed within an application process, some algorithms involved in the input recognition may be moved out of process, i.e., outside of the application process. For example, this may involve moving algorithms that detect gaze input and intent out of an application's process such that the application does not have access to user activity data corresponding to where a user is looking or only has access to such information in certain circumstances, e.g., only for specific instances during which the user exhibits an intent to interact with a user interface element.

Some implementations recognize input using a model in which an application declares or otherwise provides information about its user interface elements so that a system process that is outside of the application process can better facilitate input recognition. For example, an application may declare the locations and/or user interface behaviors/capabilities of its buttons, scroll bars, menus, objects, and other user interface elements. Such declarations may identify how a user interface should behave given different types of user activity, e.g., this button should (or should not) exhibit hover feedback when the user looks at it.

The system process (e.g., outside of the application process) may use such information to provide the desired user interface behavior (e.g., providing hover feedback in appropriate user activity circumstances). For example, the system process may trigger hover feedback for a user interface element based on a declaration from the application that the app's user interface includes the element and that it should display hover feedback, e.g., when gazed upon. The system process may provide such hover feedback based on recognizing the triggering user activity (e.g., gaze at the user interface object) and may do so without revealing to the application the user activity details associated with the user activity that triggered the hover, the occurrence of the user activity that triggered the hover feedback, and/or that the hover feedback was provided. The application may be unaware of the user's gaze direction and/or that hover feedback was provided for the user interface element.

In another example, an application declares a menu as part of its user interface and declares that the menu is expandable using a set of identified expanded menu options. The system process may handle the expansion of the user interface menu. The system process may provide menu expansion (e.g., via a system process outside of the application process) based on recognizing a triggering user activity (e.g., gaze at the menu's label) and may do so without revealing to the application the user activity details associated with the user activity that triggered the menu expansion, the occurrence of the user activity that triggered the menu expansion, and/or that the fact that the menu was expanded. The application may be unaware of the user's gaze direction and/or that the menu was expanded.

Some aspects of input recognition may be handled by the application itself, i.e., in process. However, the system process may filter, abstract, or otherwise manage the information that is made available to the application to recognize input to the application. The system process may do so in ways that facilitate input recognition that is efficient, accurate, consistent (within the application and across multiple applications), and that allow the application to potentially use easier-to-implement input recognition and/or legacy input recognition processes, such as input recognition processes developed for different systems or input environment, e.g., using touch screen input processes used in legacy mobile apps.

Some implementations, use a system process to provide interaction event data to applications to enable the applications to recognize input. The interaction event data may be limited so that all user activity data is not available to the applications. Providing only limited user activity information may help protect user privacy. The interaction event data may be configured to correspond to events that can be recognized by the application using a general or legacy recognition process. For example, a system process may interpret 3D user activity data to provide interaction event data to an application that the application can recognize in the same way that the application would recognize a touch event on a touch screen. In some implementations, an application receives interaction event data corresponding to only certain types of user activity, e.g., intentional or deliberate actions on user interface objects, and may not receive information about other types of user activity, e.g., gaze only activities, a user moving their hands in ways not associated with UI-interactions, a user moving closer to or further away from the user interface, etc. In one example, during a period of time (e.g., a minute, 10 minutes, etc.) a user gazes around a 3D XR environment including gazes at certain user interface text, buttons, and other user interface elements and eventually performs an intentional user interface interaction, e.g., by making an intentional pinch gesture while gazing at button X. A system process may handle all of the user interface feedback during the gazing around at the various user interface elements without providing the application information about these gazes. On the other hand, the system process may provide interaction event data to the application based on the intentional pinch gesture while gazing at button X. However, even this interaction event data may provide limited information to the application, e.g., providing an interaction position or pose identifying an interaction point on button X without providing information about the actual gaze direction. The application can then interpret this interaction point as an interaction with the button X and respond accordingly. Thus, user behavior that is not associated with intentional user interactions with user interface elements (e.g., gaze only hover, menu expansion, reading, etc.) are handled out of process without the application having access to user data and the information about the intentional user interface element interactions is limited such that it does not include all of the user activity details.

Figure 4A:
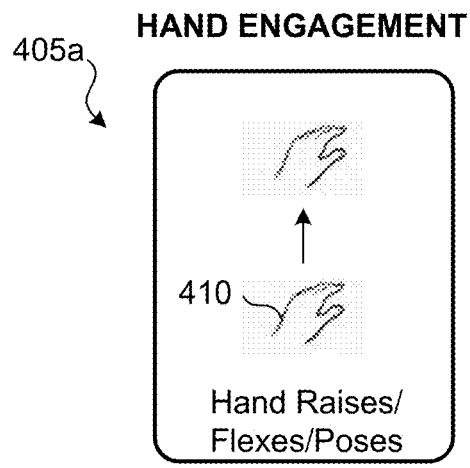
FIGS. 4A, 4B, and 4C illustrate hand engagement, indirect selection, and indirect gestures based on hand and gaze, in accordance with some implementations.
Figure 4B:
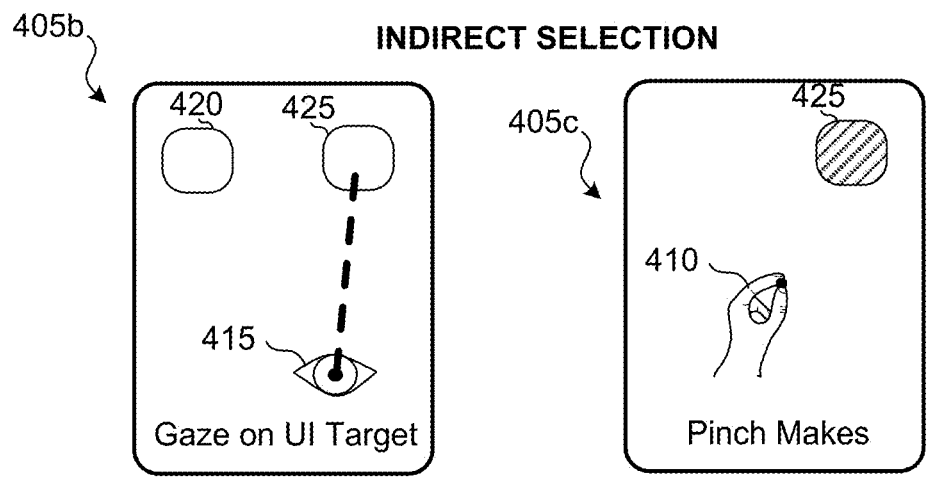
Figure 4C:
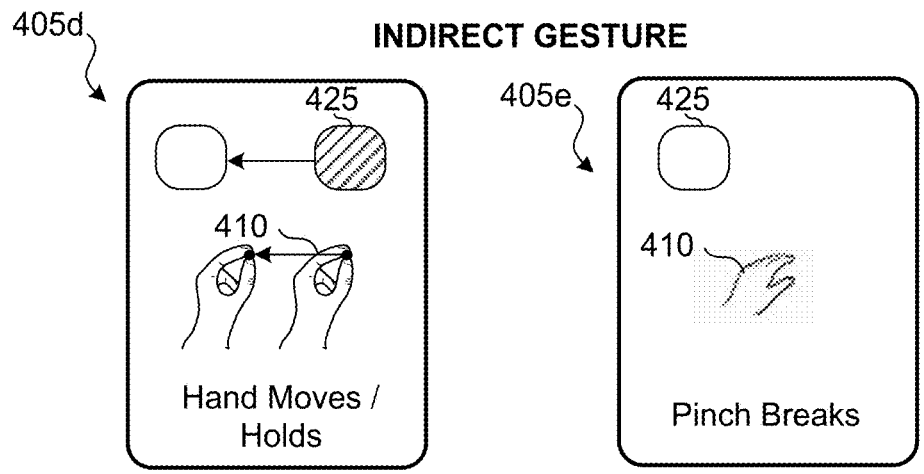

FIGS. 4A, 4B, and 4C illustrate hand engagement, indirect selection, and indirect gestures based on hand and gaze.

In FIG. 4A, illustration 405a illustrates a hand engagement user input in which a user provides input by simply raising/moving hand 410. In this example, the hand engagement user input is treated as input without requiring and/or using any associated gaze or other eye data.

Such hand gestures may be recognized by a device using one or more sensors of various types. For example, an image sensor may capture a sequence of images that may be interpreted to identify an object (e.g., hand) and its movement path, configuration (e.g., whether fingers are touching/pinching or not), etc.

In FIG. 4B, illustrations 405b-c illustrate a gaze-and-gesture-based selection. Illustration 405b illustrates a user eye 415 gazing at a user interface object 425, which is one of two user interface objects 420, 425 that are visible to the user in this example. In illustration 405c, the user makes a pinch gesture with hand 410 to identify the user interface object 425. The user interface object 425 is identified based on the pinch being associated with the gaze at that user interface object 425 as shown in illustration 405b. The association of the pinch of illustration 405c with the gaze (and its associated user interface object) of illustration 405b can be based on various association criteria. For example, the pinch and gaze/user interface object may be associated based on the pinch and gaze occurring at the same time. In another example, the pinch and gaze/user interface object may be associated based on the gaze occurring within a predetermined threshold amount of time prior to or after the pinch.

In the example of FIG. 4B, user interface object 425 is graphically changed (e.g., with highlighting, a different color, etc.) to illustrate that the object was selected based on the selection input recognized based on the user's gaze. In other words, the selected user interface object 425 is identified as having been selected based on a change to its appearance. In some implementations, an event is used to trigger a user interface response that is analogous to a traditional mouse-based hover user interface response. In some implementations, gaze direction alone (i.e., prior to or without a pinch being received) is used to trigger a user interface response. A gaze-based event may be identified and used to trigger such a user interface response. For example, a gaze event may be recognized, the user interface target at which the gaze is directed (e.g., user interface element 425) may be identified based on the gaze direction during the gaze event, and the user interface modified with a response corresponding to recognizing that the user is intentionally looking at that user interface target, e.g., by highlighting user interface element 425.

The user's gaze may additionally, or alternatively, be associated with a gesture as illustrated in FIG. 4B. In some implementations, a gaze event is used to trigger a user interface response that is analogous to a traditional mouse-based click/selection user interface response. In some implementations, gaze direction along with a user gesture is used to trigger a user interface response. A gaze event may be identified, associated with the user gesture, and the gaze-gesture input combination used to trigger such a user interface response. For example, a gaze event may be recognized, a gesture may be associated with that gaze event (e.g., based on occurring at or around the same time), the user interface target at which the gaze is directed (e.g., user interface element 425) may be identified based on the gaze direction during the gaze event, and the user interface modified with a response corresponding to recognizing that the user is intentionally looking at that user interface target at (or around) the time the user provides the gesture, e.g., by triggering a selection of the user interface element 425 and/or a change in the appearance of user interface element 425, etc.

The eye and hand activities of FIG. 4B can be detected based on one or more sensors. For example, eye activity may be detected based on an inward facing camera of a HMD while the hand activity may be detected based on an outward facing camera on the HMD.

In FIG. 4C, illustrations 405d-e illustrate a gesture-based input. Illustration 405d shows a hand gesture in which the user moves the hand 410 left while pinching, i.e., the pinch/touching fingers are maintained during the pinch. In this example, the pinch illustrated in illustration 405c is maintained as illustrated in illustration 405d. In other words, as the pinch is made (i.e., the fingers come together and touch), the pinch based on that instant in time is associated with a user interface element 425, which is selected based on that pinch and gaze association (shown in FIG. 4B), and the continuing/ongoing pinch in which the finger and thumb remain touching is then interpreted as additional input as illustrated in illustration 405d of FIG. 4C. In illustration 405*d*, the hand engagement user input is treated as input without requiring and/or using any associated gaze or other eye data. The input is simply the movement of hand 410 in a leftward direction.

Based on this activity, the selected user interface object 425 is moved. In this example, the direction and distance that the selected user interface object moves is based on the direction and distance that the hand moves. In some implementations, the direction of user interface object movement is constrained to a direction on a defined 2D plane, e.g., a direction on the 2D plane upon which user interface elements are displayed such as on a virtual screen a few feet in front of the user. For example, the direction of the user interface object movement may be constrained to a direction that most closely corresponds to the 3D direction of the hand's movement. In some implementations, the amount of movement/distance is scaled, e.g., 1 inch of hand movement corresponds to 2 inches of user interface object movement, 4 inches of user interface object movement, 1 foot of user interface object movement, etc.

In illustration 405*e*, the user breaks the pinch that was made in illustration 405*c* and maintained during the movement of illustration 405*d*. In illustration 405*e*, the hand engagement user input (breaking the pinch) is treated as input without requiring and/or using any associated gaze or other eye data. The input is simply the separation of the fingers that had been pinched together. In this example, the pinch break of illustration 405*e* is interpreted to end the movement of the user interface object 425, i.e., the user interface object 425 stops moving based on the movement of the hand once the pinch is broken.

The hand gestures of illustrations 405*d-e* may be recognized by a device using one or more sensors of various types. For example, an image sensor may capture a sequence of images that may be interpreted to identify an object (e.g., hand) and its movement path, configuration (e.g., when fingers touch/pinch, when fingers stop touching/pinching), etc.

FIG. 5 illustrates an exemplary interaction tracking flow 500. In this example, at motion classification block 510, eye gaze data 505 is classified into events of different classification types. This may involve an algorithm or machine learning model processing gaze data, e.g., a series of gaze direction and/or gaze velocity values, and determining gaze events occurring at one or more points in time. At block 520, pose stabilization and saccade rejection are applied to the gaze data and/or gaze classifications. The stabilization may adjust for eye twitch and/or small eye movements that do not correspond to intentional/perceptive user eye movements. The saccade rejection may involve identifying eye gaze events that correspond to involuntary/reflexive eye saccades and removing those events, e.g., altering the gaze data to remove gaze data corresponding to those types of gaze events.

At block 530 (hit test manager), the eye gaze data (e.g., eye gaze events identified within the stabilized and saccade removed eye gaze data) is assessed along with user interface collision data 540 to identify eye fixations corresponding to particular user interface elements. For example, a user interface on a virtual 2D surface or within a 3D region may be presented within a view of a 3D environment. Gaze directions of gaze events within that 3D environment may be assessed relative to the user interface elements, e.g., to identify when gaze directions of the gaze events intersect with (or are close to) particular user interface elements. For example, this may involve determining that the user is gazing at a particular user interface element at a particular point in time when a gaze event is occurring.

At block 560 (pinch & gaze association), hand data 550 is associated with the gaze events and associated user interface elements identified by the hit test manager 530. This may involve determining that a hand gesture that occurs at a particular instant in time or during a particular period of time should be associated with a particular gaze event and its associated user interface element. Such association may be based on timing and/or other criteria.

At block 570 (interaction state manager), the hand data 550 associated with gaze events and associated user interface element is used to manage interactions. For example, user input events may be provided to an application that is providing a user interface so that the application can respond to the user input events, e.g., by changing the user interface. The user input events may identify the user interface element that a given input is associated with, e.g., identifying that the user has provided gaze-plus-pinch input selecting element A, that the user has provided pinch input moving 10 distance units to the left, that the user has released a pinch, etc. User input is thus recognized and used to trigger interaction state updates.

Gaze-to-Element Break Delay Optimizations

Some implementations disclosed herein delay breaking an association between a user's gaze and an element when the user's gaze is detected off of the element, e.g., providing a gaze hover break delay. Some implementations, optimize such delays, for example, to best account for user intentions, e.g., whether the off-element gaze was the result of intention or unintentional user activity. On a device, a user's gaze may be tracked to identify which user interface element the user is looking at and feedback provided to the user based on this tracking. For example, hover-type feedback may be provided based on the user looking at a first user interface icon and then a second user interface icon, e.g., first highlighting the first icon while the user's gaze is on the first icon and then highlighting the second user interface icon while the user's gaze is on that icon. A mitigation technique may be used to fix the user's gaze direction, e.g., not treating the gaze as leaving a user interface element or moving to another user interface element) during certain circumstances, such as when the user blinks or saccades. However, such a mitigation technique may result in a user's gaze being treated as being fixed on an initial target for a delayed period after the user's gaze has left the target. This may result, for example, in the first user interface icon being highlighted for longer than the user expects after moving their gaze away from the first user interface icon.

Some implementations provide techniques that limit the effects of such a mitigation technique to avoid such delays. Thus, as an example, such implementations may avoid delays in breaking a hover that might otherwise occur due to the mitigation technique. This may involve ensuring that a hover is broken more quickly after the user's gaze leaves a target than would otherwise be allowed by the mitigation technique. Some implementations continue to track a user's gaze (e.g., raw gaze) during such a mitigation (e.g., in which the gaze is treated as fixed due to a potential blink/saccade) and determine, based on the gaze characteristics, that the user's gaze has left a user interface target and thus break a hover-type event associated with the user interface target. In some implementations, this is done using certain criteria. Such criteria may be indicative of confidence that a user's gaze has intentionally left an element versus having left temporarily, e.g., due to a blink or saccade. In some implementations, this involves determining that the gaze is outside of a region associated with a target (e.g., outside a target zone around (e.g., 1.2 degrees outside of) for more than a threshold number of frames (e.g., more than 5 consecutive frames).

FIG. 6A illustrates maintaining and then discontinuing a gaze-to-element association as a user looks away from an element. A user's gaze 620 may move over a period of time from being directed at a first user interface element 600 to being directed towards a second user interface element 610. In this example, the system monitors the gaze 620. If the gaze has left the effective "fuzzy" target bounds 605 around the first user interface element 600 for more than a threshold (e.g., more than 5 frames), the association between the gaze and the element is broken. The first user interface element 600 may be de-hovered accordingly. De-hovering may involve changing a state of a user interface element such that it is no longer distinguished from other elements, e.g., no longer highlighted, no longer expanded, no longer presented using different color, font, effects, etc., to be distinguished from non-hovered elements.

The "fuzzy" target bounds 605 may provide extra error around a target to account for inaccuracies, e.g., inaccuracies in the gaze sensing equipment and processes. For example, in a system in which gaze in accuracy is about 1 degree and in which there is 0.2 degrees of angular hysteresis, a "fuzzy" target bounds 605 may include area around a target to account for that error and hysteresis, e.g., providing 1.2 degrees (e.g., corresponding for example to angle 670 shown in FIG. 6B) of padding around first user interface element 605.

In some implementations, the "fuzzy" target bounds is based on the same boundaries that are used for a "fuzzy" hit testing process in which user activity is assessed to determine whether it should be considered an intentional user interaction with a user interface element. For example, the same boundary may be used to (a) determine whether a gaze is close enough to a user interface element to be considered an intentional interaction with the element and (b) determine whether the user's gaze is no longer looking at the element for purposes of breaking a delayed gaze-to-element association. In other examples, different boundaries can be used to (a) determine whether a gaze is close enough to a user interface element to be considered an intentional interaction with the element and (b) determine whether the user's gaze is no longer looking at the element for purposes of breaking a delayed gaze-to-element association. In one example, a fuzzy hit test boundary can be used to associate an internal interaction with a UI element, and the actual, non-fuzzy boundary can be used to determine when gaze is no longer looking at the element for gaze delay breaking.

In some implementations, a gaze 620 is considered locked onto the first user interface element 600 (e.g., the determined filtered gaze is fixed) when the gaze 620 first leaves the first user interface element 600. The system determines, on every frame that the filtered gaze is locked, the closest point from the raw gaze to the bounds of the target (e.g., the "fuzzy" target bounds 605). If the angular distance>=MAX_FUZZY_RADIUS degrees (e.g., 1.2), a break timer/counter is incremented. The timer/counter is reset if the gaze comes back within the target bounds (e.g., within the "fuzzy" target bounds 605) before the timer/counter expires. The threshold (e.g., 5 frames) may be set to a value to prevent false saccades during a blink from causing flicker of the gaze-based feedback. Once the association is broken (e.g., the first user interface element 600 is de-hovered), the system may prevent a new association with the first user interface element 600 until the gaze is unlocked. This may prevent state flicker.

FIG. 6A provides an example of techniques that avoid or limit perceived break latency (e.g., hover break latency) that may result from a fixation lock technique. Such breaking techniques may be configured and used to break gaze-to-element associations as early as possible when the system is confident that the user has shifted their gaze off of a first target and/or onto a second target, e.g., confident that the off-element gaze is not due to a blink or other unintentional behavior. The break could be implemented as soon as gaze has left the effective fuzzy target bounds 605. However, it may be desirable to wait a short period of time (e.g., for 1, 2, 3, 4, 5, 6, etc. frames). Longer waiting before breaking may increase confidence that the off-element gaze is intentional before breaking.

The processes illustrated in FIG. 6A and described herein can account for the circumstance in which, during eye activity, it may initially (e.g., during the first couple frames) be difficult to distinguish fixations, saccades, and blinks with high accuracy, i.e., difficult to determine whether the user intends their gaze to have left the target or not. A blink might be falsely classified as a saccade during the first few frames. However, after more frames (e.g., 5) there may be significantly more confidence in classifying blinks versus saccades and/or otherwise determining when a user's gaze has intentionally left a target user interface element.

Some implementations generate a filtered gaze signal based on a raw gaze signal where saccades, blinks, fast fixations, or other eye behavior not associated with intentional user activity are filtered out. User interface responses may generally be driven by such a filtered gaze signal. A filtered gaze system may have mitigations built in that keep the filtered gaze on a user interface target during periods in which the actual/raw gaze leaves the target, e.g., providing a filtered gaze that is "locked" onto the target (or "fixed" on the target) even when the gaze has actually left the target. Some implementations use raw gaze data to break such gaze locking/fixing in certain circumstances. This may break gaze-to-element associations and result in de-hovering that feels more responsive to the user than otherwise. For example, as a user looks away from an icon, the icon may de-hover more quickly than it otherwise would. In another example, as a user looks away from an element having an associated expanded menu, the expanded menu my contract and/or disappear more quickly than it otherwise would.

In addition or the alternative to determining whether a gaze is outside of a region associated with a user interface element for more than a number of frames, other criteria may be used to break a gaze-to-element association. For example, whether the direction of gaze change, the velocity of gaze change, or other characteristics of gaze movement satisfy a criterion may be used to break a gaze-to-element association when the user's gaze leaves the element.

Figure 7:
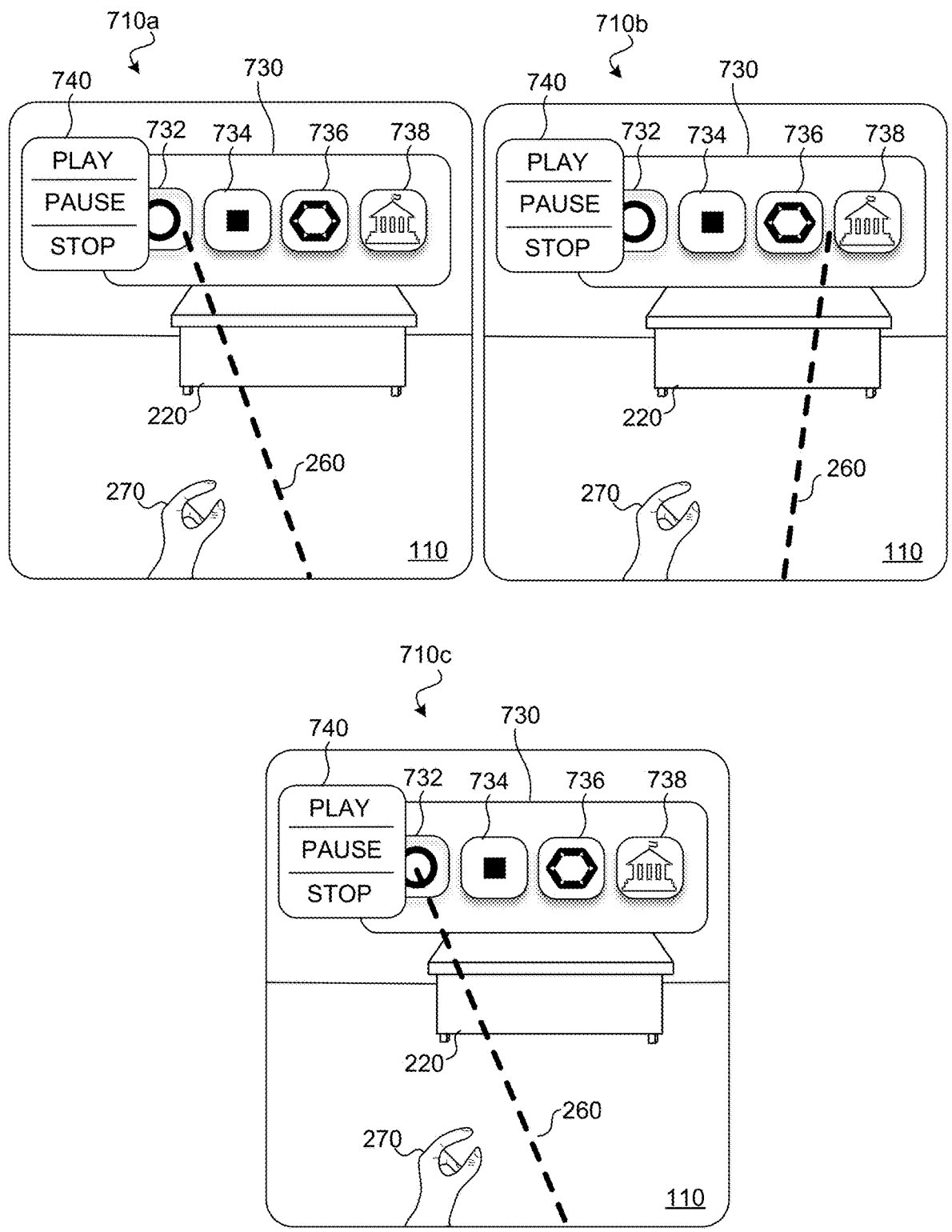
FIG. 7 illustrates maintaining a gaze-to-element association as a user looks away from an element and then back to the element, in accordance with some implementations.

FIG. 7 illustrates maintaining a gaze-to-element association as a user looks away from an element and then back to the element. In this example, a user views an XR environment that includes a depiction 220 of desk 120 (FIG. 1A-B) and a user interface 730 that includes user interface elements 732, 734, 736, 738. At a first time, during view 710*a*, the user gazes in gaze direction 260 at the user interface element 732 and a menu 740 that is associated with the user interface element 732 is shown, i.e., gazing at the user interface element 732 is recognized, an association between the gaze and user interface element 732 is created, and this triggers the display of the menu 740. At a later time (e.g., the next frame), the user's gaze direction 260 shifts off of the user interface element 732 in view 710*b*. The association between the gaze and the user interface element 732 is maintained during this period. Accordingly, the menu 740 continues to be displayed even though the gaze is not directed at the user interface element 732. At a later time (e.g., the next frame), the user's gaze direction 260 shifts back to the user interface element 732 in view 710*b*. The association between the gaze and the user interface element 732 is maintained during the period. Accordingly, the menu 740 continues to be displayed. Thus, during the sequence of gaze movements illustrated in FIG. 7, the user's gaze moves off of and then back onto the user interface element 732 and, during this movement, the association between the gaze and the user interface element is maintained 732 and the associated effect (i.e., the display of menu 740) is provided continuously. The brief (and probably unintentional) gaze motion does not result in the menu 732 flickering off and then back on. Rather the menu 732 is displayed continuously.

Figure 8:
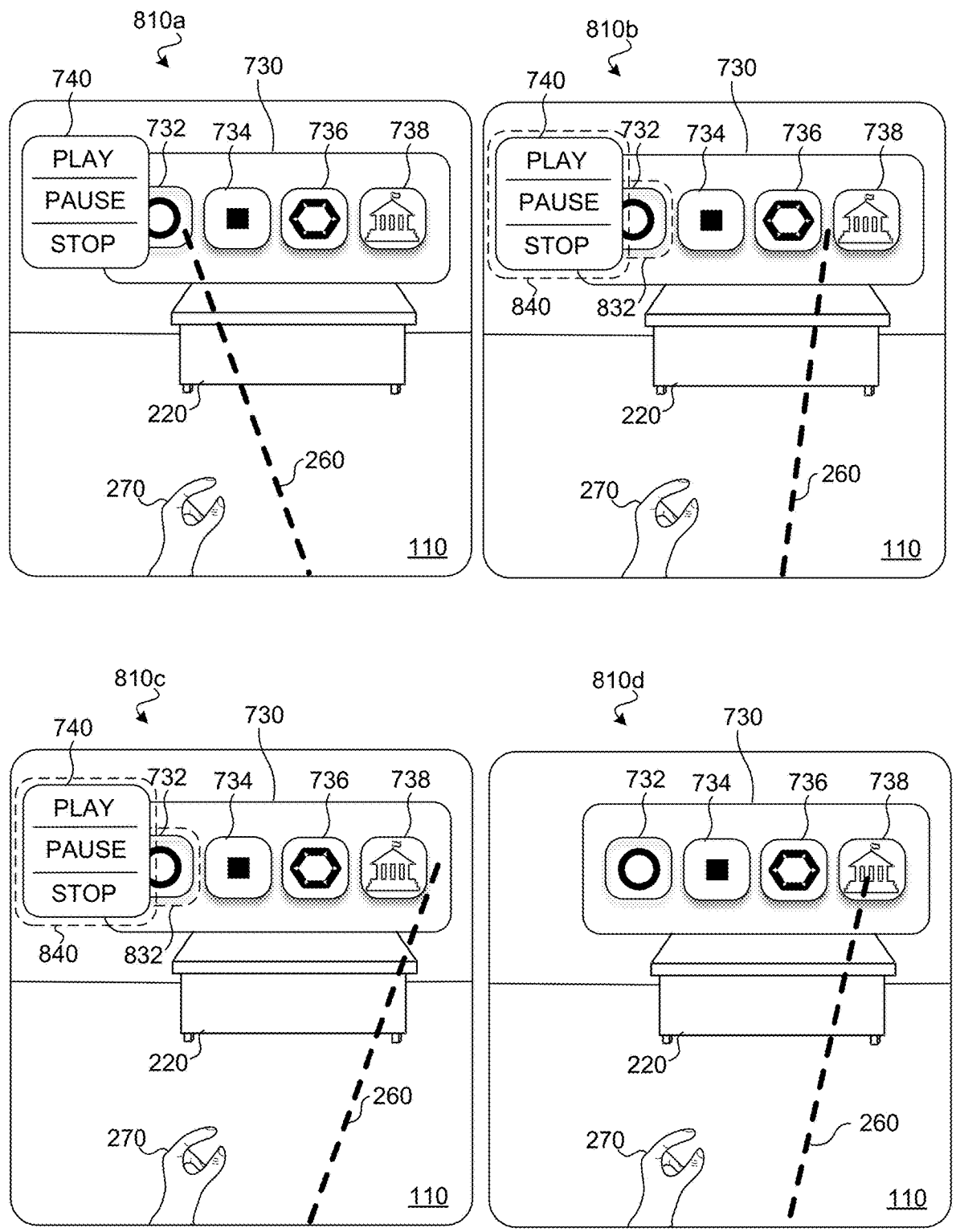
FIG. 8 illustrates maintaining and then discontinuing a gaze-to-element association as a user looks away from an element, in accordance with some implementations.

FIG. 8 illustrates maintaining and then discontinuing a gaze-to-element association as a user looks away from an element. In this example, a user views an XR environment that includes a depiction 220 of desk 120 (FIG. 1A-B) and a user interface 730 that includes user interface elements 732, 734, 736, 738. At a first time, during view 810*a*, the user gazes in gaze direction 260 at the user interface element 732 and a menu 740 that is associated with the user interface element 732 is shown, i.e., gazing at the user interface element 732 is recognized, an association between the gaze and user interface element 732 is created, and this triggers the display of the menu 740.

At a later time (e.g., the next frame—one frame after view 810*a*), the user's gaze direction 260 shifts off of the user interface element 732 in view 810*b*. The association between the gaze and the user interface element 732 is maintained during this period. The system may determine to maintain the association (e.g., to not yet break the association) based on assessing a criterion. In this example, the system determines that the gaze 260 is outside of a region (i.e., a combined region of a first region 832 around button 732 and a second region 840 around menu 740). However, this is the first frame during which the gaze 260 is outside of that region and thus the system determines that the break criterion (e.g., requiring that the gaze be outside of the region for 5 frames) is not satisfied. Accordingly, the menu 740 continues to be displayed even though the gaze is not currently directed at the user interface element 732.

At a later time (e.g., four frames after view 810*a*), the user's gaze direction 260 has not returned to gaze at the user interface element 732 (or menu 740) as shown in view 810*c*. In other words, the gaze has not returned during the first frame after view 810*a*, the second frame after the view 810*a*, the third frame after the view 810*a*, or the fourth frame after the view 810*a*. The association between the gaze and the user interface element 732 is maintained during this period. The system may determine to maintain the association (e.g., to not yet break the association) based on assessing a criterion. In this example, the system determines that the gaze 260 is outside of a region (i.e., a combined region of a first region 832 around button 732 and a second region 840 around menu 740). However, this is only the fourth frame during which the gaze 260 is outside of that region and thus the system determines that the break criterion (e.g., requiring that the gaze be outside of the region for 5 frames) is not satisfied. Accordingly, the menu 740 continues to be displayed even though the gaze is not currently directed at the user interface element 732.

At a later time (e.g., five frames after view 810*a*), the user's gaze direction 260 has not returned to gaze at the user interface element 732 (or menu 740) as shown in view 810*d*. In other words, the gaze has not returned during the first frame after view 810*a*, the second frame after the view 810*a*, the third frame after the view 810*a*, the fourth frame after the view 810*a*, or the fifth frame after the view 810*a*. The system determines to break the association between the gaze 260 and the user interface element 732 based on assessing a criterion. In this example, the system determines that the gaze 260 is outside of a region (i.e., a combined region of a first region 832 around button 732 and a second region 840 around menu 740). Since this is the fifth frame during which the gaze 260 is outside of that region, the system determines that the break criterion (e.g., requiring that the gaze be outside of the region for 5 frames) is satisfied. Accordingly, the association is discontinued and the display of the menu 740 is discontinued.

Thus, during the sequence of gaze movements illustrated in FIG. 8, the user's gaze moves off of the user interface element 732 and stays off of the user interface element for a period that exceeds a break threshold, e.g., at least 5 frames. During this gaze movement, the association between the gaze and the user interface element is initially maintained 732 and the associated effect (i.e., the display of menu 740) is initially provided. However, once the criterion is satisfied, the association is broken and the menu display is discontinued. This breaking of the association and discontinuing of the display of an associated effect may occur more quickly than otherwise.

Figure 9:
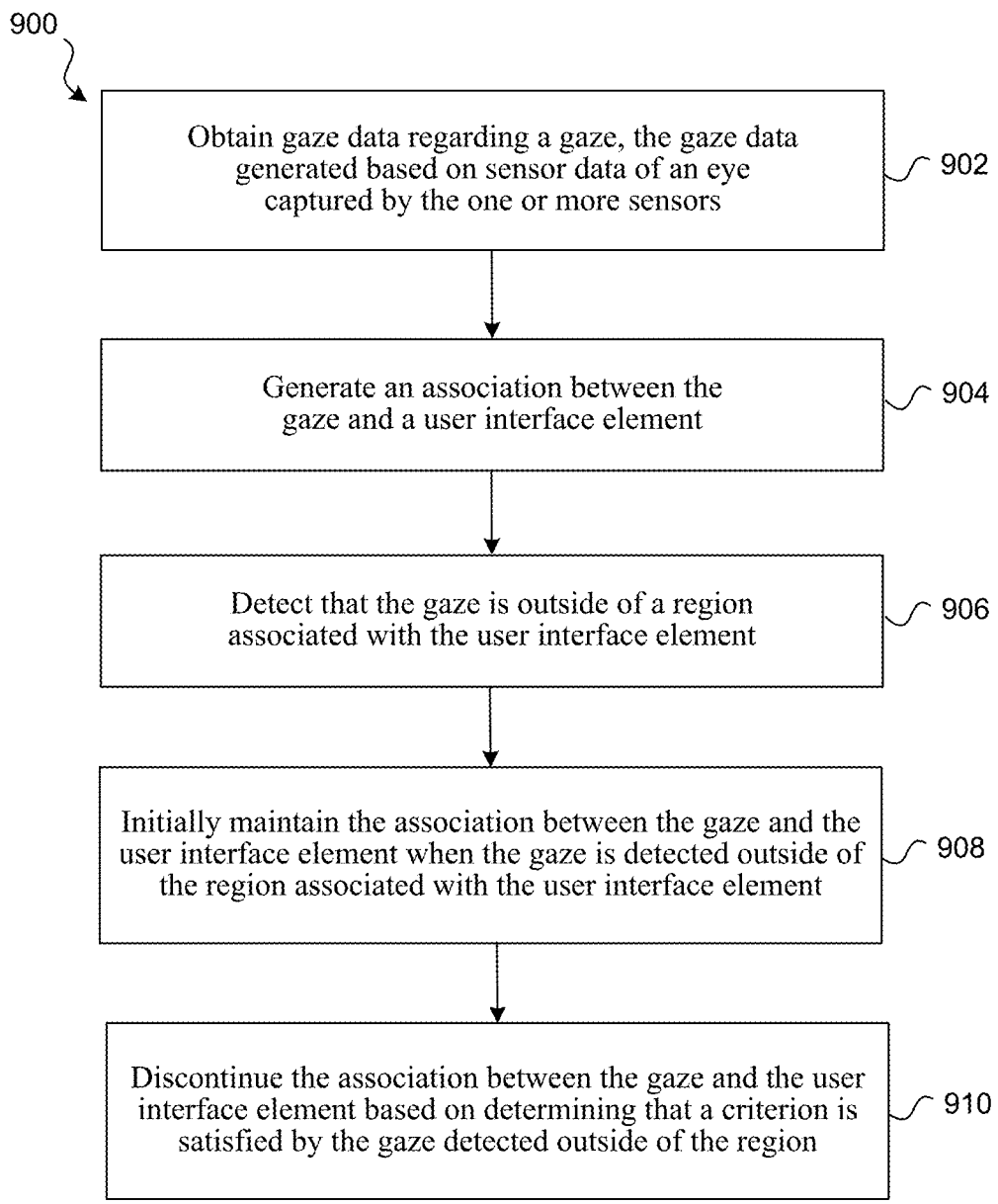
FIG. 9 is a flowchart illustrating a method for maintaining and discontinuing a gaze-to-element association as a user looks away from an element, in accordance with some implementations.

FIG. 9 is a flowchart illustrating a method 900 for maintaining and discontinuing a gaze-to-element association as a user looks away from an element. In some implementations, a device such as electronic device 105 or electronic device 110 performs method 900. In some implementations, method 900 is performed on a mobile device, desktop, laptop, HMD, or server device. The method 900 is performed by processing logic, including hardware, firmware, software, or a combination thereof. In some implementations, the method 900 is performed on a processor executing code stored in a non-transitory computer-readable medium (e.g., a memory).

At block 902, the method 900 obtains gaze data regarding a gaze, the gaze data generated based on sensor data of an eye captured by the one or more sensors.

At block 904, the method 900 generates an association between the gaze and a user interface element. The association between the gaze and the user interface element may be based on an initial determination that the gaze is directed at or near the user interface element. The association between the gaze and the user interface element is maintained initially based on: detecting an event having a characteristic; (e.g., a saccade, a blink, etc.) and maintaining the association between the gaze and the user interface element for a time period following the event unless the criterion is satisfied by the gaze detected outside of the region. Such an event may be detected based on: (a) an amplitude representing velocity change during the event; (b) a rate of change of velocity during the event; (c) a duration of the event; and/or (d) distance of eye travel during the event.

The association between the gaze and the user interface element may trigger the initiation of a hover state and/or the provision of hover feedback. Thus, the method 900 may display hover feedback for the user interface element based on the association between the gaze and the user interface element. The method 900 may display a menu expansion associated with the user interface element based on the association between the gaze and the user interface element.

At block 906, the method 900 detects that the gaze is outside of a region associated with the user interface element and, at block 908, the method 900 initially maintains the association between the gaze and the user interface element when the gaze is detected outside of the region associated with the user interface element. The method 900 may determine that the criterion is satisfied by determining that the gaze is outside of the region associated with the user interface element for a threshold number of frames. The region associated with the user interface element may be determined based on control region associated with the user interface element. The region associated with the user interface element is determined based on control region associated with the user interface element and additional area around the control region. For example, the region may be a defined by a "fuzzy" target bounds as illustrated in FIGS. 6 and 8.

The method 900 may determine that the criterion is satisfied by: on every frame that the gaze is determined to be fixated, computing a distance (e.g., angular) from the raw gaze to a bounds of the user interface element; determining if the distance is greater than a threshold distance; tracking a number of frames that the distance is greater than the threshold; and determining the criterion is satisfied when the tracked number of frames exceeds a threshold number of frames.

The tracked number of frames (e.g., the counter/timer) may be reset if the gaze returns to the region associated with the user interface element.

At block 910, the method 900 discontinues the association between the gaze and the user interface element based on determining that a criterion is satisfied by the gaze detected outside of the region.

Dynamic Fixation Suppression Optimizations

Some implementations disclosed herein optimize a dynamic fixation suppression technique. A dynamic fixation suppression technique can be applied to account for the possibility that when a user looks from one user interface element to another user interface element, their gaze may inadvertently look at (and even briefly fixate upon) one or more other user interface elements along the way. In some implementations, a fast fixation lock is provided that lasts a number of frames, e.g., a 4-8 frames fast fixation lock. Such a lock may provide various benefits, e.g., reducing flicker, but be undesirable for some circumstances such as when a user rapidly looks from element to element to enter a passcode into a user interface that the user is very familiar with. In such cases, the user may not fixate for the minimum number of frames on each user interface element and may provide selection input (e.g., pinching) slightly before or after their rapidly moving gaze lands on each desired user interface element. Some implementations provide fast fixation suppression in a way that accounts for competing objectives, e.g., (1) only providing hover feedback in circumstances in which there is high confidence that the user's gaze has intentionally landed on a user interface target and (2) enabling fast interactions with some user interface elements in some circumstances, e.g., enabling the user to quickly make a series of selections by quickly moving their gaze from a first user interface element by quickly gazing from one user interface element to the next.

FIGS. 10A-D illustrate gaze interpretation techniques.

Figure 10A:
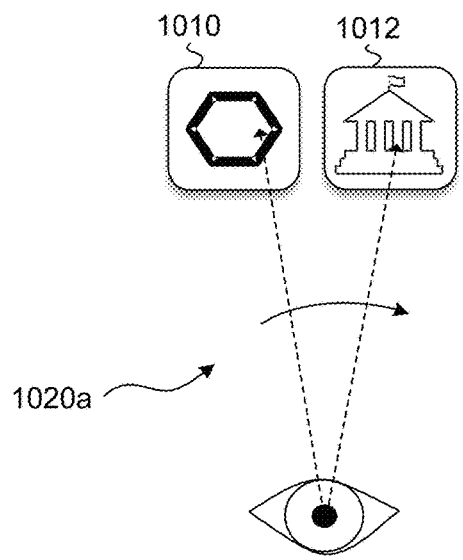
FIGS. 10A-D illustrate breaking through a fast fixation suppression technique, in accordance with some implementations.

FIG. 10A illustrates minimizing suppression when gaze shifts over relatively short distances. FIG. 10A illustrates a gaze 1020a moving from one user interface element 1010 to another user interface element 1012. In this example, the gaze-to-element association and/or association-based-feedback (e.g., hover feedback) instantly transitions based on the eye movement being shorter than a threshold, e.g., corresponding to less than a threshold distance for a small saccade. The threshold may be set at, e.g., a minimum distance determined to be associated with inaccurate gaze movement tracking. Little suppression may be needed for relatively short eye movements since within short distances (e.g., within the user's fovea), users are usually very accurate and may be sensitive to latency. FIG. 10A illustrates a technique that may be used to provide instant hover transitions for small saccades.

Figure 10B:
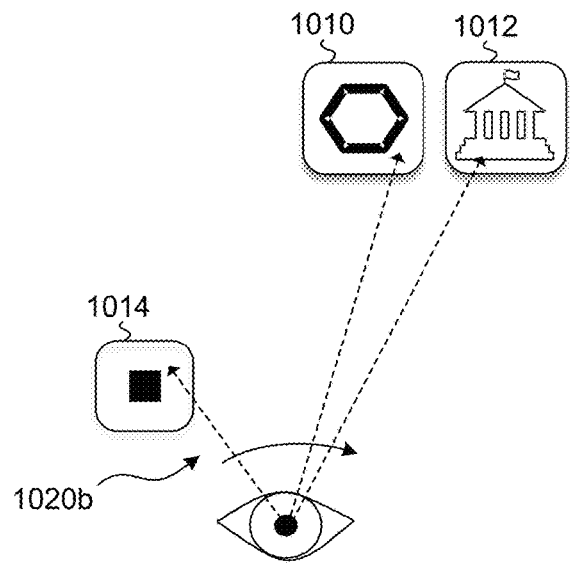

FIG. 10B illustrates suppression when a gaze makes a large movement but initially lands nearby the user's new intended target, potentially on a nearby element. FIG. 10B illustrates a gaze 1020b moving from one user interface element 1014 to another user interface element 1010 and then to another user interface element 1012. In this example, the gaze-to-element association and/or association-based-feedback (e.g., hover feedback) are not instantly transitioned (i.e., the fast fixation from user interface element 1014 to 1010 is suppressed for a period of time) and if the gaze upon user interface element 1010 does not last long enough (e.g., more than a threshold number of frames), it is rejected. This suppression is based on the eye movement being greater than a threshold distance, e.g., for a large saccade. Since the user's gaze 1020b does not remain on user interface element 1010 for more than a threshold amount of time because it quickly transitions to the user's actual intended target, there is no gaze-to-element association formed. In other words, the process accounts for a circumstance in which eye's gaze location inaccurately initially lands near but not on a target UI element (e.g., perhaps due to biomechanical eye control, the gaze stops for a short period of time on a neighboring UI element before moving onto the intended target). Then, the gaze 1020b lands upon user interface element 1012 and remains for a sufficient number of frames so that a gaze-to-element association with user interface element 1012 is formed. FIG. 10B illustrates a technique that may be used to provide hover suppression for fast fixations after large saccades. After large saccades, user may be less accurate (e.g., landing on a target near but not quite on an intended target) and users may be less sensitive to latency.

Figure 10C:
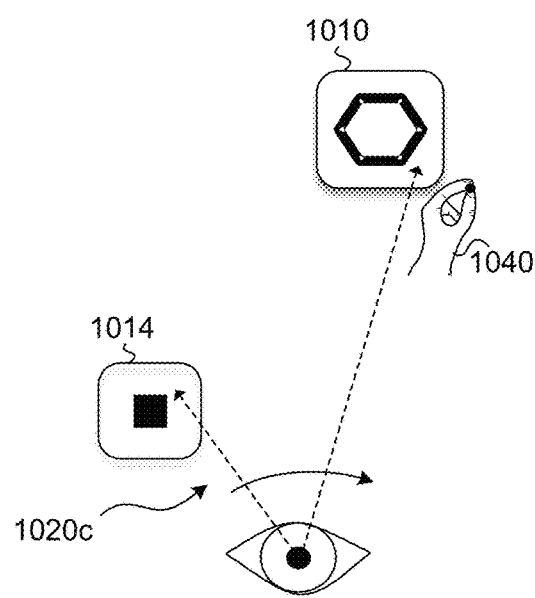

FIG. 10C illustrates a gaze 1020c moving from one user interface element 1014 to another user interface element 1010 and then, during a fast fixation gaze-to-element association suppression period, a non-gaze user activity (e.g., a pinch 1040) occurring. In this example, the gaze-to-element association and/or association-based-feedback (e.g., hover feedback) are initially suppressed and then instantly transitioned (i.e., the suppression of the fast fixation from user interface element 1014 to 1010 is discontinued) based on another user activity, e.g., pinch 1040. The association would have been suppressed for a period of time (e.g., 5 frames) following the gaze 1020c moving to the user interface element 1010. However, the occurrence of the other user activity (e.g., pinch 1040) during that time period discontinues the suppression (before the expiration of the normal suppression period) and the gaze is associated with the user interface element 1010. Moreover, the user activity (e.g., pinch) may be associated with a user interaction (e.g., a selection), which may additionally or alternatively be associated with the element.

Gaze-association-based feedback may or may not be displayed. For example, initially the user interface element 1014 may be hover highlighted and continue to be highlighted during the suppression period when after the user's gaze moves towards and lands on user interface element 1010. In one example, at the point when the other user activity (e.g., pinch 1040) is detected, the hover highlighting of user interface element 1014 may end, the user interface element 1010 may be hover highlighted, and the user interface element 1010 may be selected. In another example, at the point when the other user activity (e.g., pinch 1040) is detected, the hover highlighting of user interface element 1014 may end and the user interface element 1010 may be selected without the user interface element 1010 being hover highlighted.

FIG. 10C illustrates a technique that may be used to enable a user activity such as a pinch during a fast-fixation rejection to break through to a fixation target. This may be beneficial, for example, in the circumstances in which users do not wish to wait when typing or entering a passcode between selections.

Figure 10D:
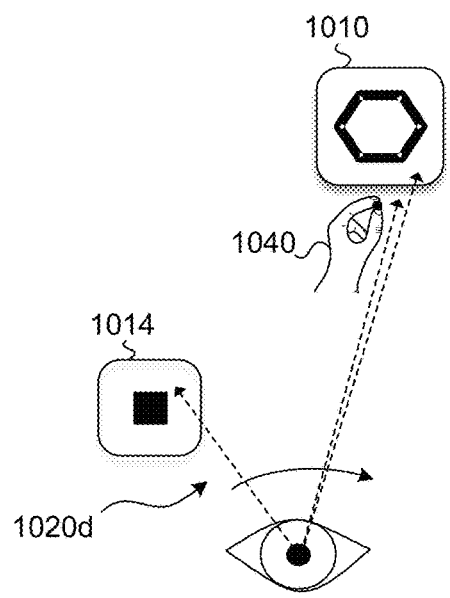

FIG. 10D illustrates a gaze 1020*d* moving from one user interface element 1014 to another user interface element 1010, where a non-gaze user activity (e.g., a pinch 1040) occurs during a fast fixation gaze-to-element association suppression period and prior to the gaze 1020*d* reaching the user interface element 1010. In this example, the gaze-to-element association and/or association-based-feedback (e.g., hover feedback) are instantly transitioned based on another user activity, e.g., pinch 1040, when the gaze lands on user interface element 1010. The association would have been suppressed for a period of time (e.g., 5 frames) following the gaze 1020*c* moving off of the user interface element 1014. However, the occurrence of the other user activity (e.g., pinch 1040) during that time period discontinues the suppression and the gaze is (before the expiration of the normal suppression period) associated with the user interface element 1010. Moreover, as described with respect to FIG. 10C, the user activity may be associated with a user interaction (e.g., a selection), which may additionally or alternatively be associated with the element.

In FIG. 10D, when the pinch comes during the saccade/transition, the system may associate the pinch with user interface element 1014 or user interface element 1010, depending on the conditions such as how much time has passed since the saccade started, the saccade amplitude, velocity, or other external information such as type of application, etc. If the pinch comes after the user has fixated on user interface element 1010 but during the suppression (first few frames of fixation on 1010), the system may always associate it with user interface element 1010.

In some implementations, a system's normal user interaction mode enables a user to make selections by pinching, where whatever the user is gazing at when the pinch occurs is selected. The system may provide feedback (e.g., hover-type feedback) as the user gazes around a user interface to show the user what element would be selected given a pinch at a given time. The techniques illustrated in FIGS. 10A-D enhance such a system by accounting for various exceptional circumstances. In FIG. 10A, the gaze is instantly transitioned to a new element association during a small eye movement (e.g., small saccade). In FIG. 10B, the gaze is not transitioned instantly to a new element but rather only transitioned after a suppression period following a larger eye movement, e.g., a large saccade. In FIGS. 10C-10D, the gaze is transitioned instantly following a large eye movement (within a suppression time window) based on a user providing addition activity (e.g., a pinch) during the time period. These techniques may be used individually and/or collectively to provide significant flexibility, responsiveness, and accuracy (e.g., relative to recognizing user intention) to a user interaction system.

In the examples of FIGS. 10C-10D, fast fixation rejection/suppression is broken through in particular circumstances (e.g., another user activity such as a pinch). In other implementations, fast fixation rejection/suppression is disabled or limited in other circumstances, such as where a user enables an expert mode, where the system recognizes that a user interface has certain characteristics (e.g., is a keyboard, number pad, etc.), where user history indicates that a user has a high level of gaze accuracy following large eye movements, during games that require or reward fast reactions/gaze activity, and/or various other circumstances.

In some implementations, fast fixation rejection/suppression is based on time, e.g., number of frames, and/or distance (e.g., large or small eye movement). Other criteria may be used, for example, using gaze velocity, acceleration, or motion pattern, or using a spatial-temporal clustering approach to further qualify a group of fast fixations, e.g., how spaced out are the fixations.

The examples in FIGS. 10C-D are described with respect to an exemplary other user activity of a pinch. Other types of non-gaze activity may additionally or alternatively be used to trigger a selection or otherwise discontinue fast fixation rejection/suppression. The activity may be any non-eye-based eye activity such as a pinch or any other hand gesture. Examples of activity distinct from the gaze events include activities that are separate from the eye, including, but are not limited to, single hand gestures, multi-hand gestures, head movements, torso movements, movements with arms or legs, whole body movements, and/or interactions with devices.

Single hand gestures include, but are not limited to, a user forming a shape/configuration and/or making a particular motion with a single hand, for example by pinching (e.g., touching a pointer or other finger to a thumb), grasping (e.g., forming hand into a ball shape), pointing (e.g., by extending one or more fingers in a particular direction), or performing a multi-finger gesture. One example of a hand gesture involves a user pinching where the pinching (e.g., touching finger to thumb and then releasing) provides input (e.g., selection of whatever the user is gazing upon). Another example of a hand gesture involves a user pinching (e.g., to initiate detection of the gesture) followed by a movement or change to the hand while the pinching is maintained, e.g., pinching and then moving the hand to provide a directional input movement based on the direction of the movement of the hand.

One example of a multi-finger gesture is a user spreading all fingers apart (e.g., configuring the hand so that no finger touches any other finger). Another example of a multi-finger gesture is a multi-finger swipe (e.g., extending two or more fingers and moving those fingers along a particular path or across a particular real or virtual surface). Another example of a multi-finger gesture is a hand-held approximately flat with fingers all touching adjacent fingers. Another example of a multi-finger gesture is two fingers extended in a peace-sign configuration. Another example of a multi-finger gesture is all fingers extending straight from the palm and then bent at their respective knuckles. Another example of a multi-finger gesture is the thumb touching two or more of the finger's tips in a particular sequence, e.g., first touching the pointer finger then touching the pinky finger. Another example of a multi-finger gesture is fingers held in a particular configuration, e.g., pointer touching middle finger, middle finger not touching ring finger, ring finger touching pinky finger while the whole hand moves along a particular path, e.g., up and down.

Multi-hand gestures include, but are not limited to, a user forming a shape/configuration and/or making a particular motion with both hands simultaneously or within a threshold amount of time of one another, e.g., within a 2 second time window. One example of a multi-hand gesture involves a user pinching both hands where the pinching (e.g., touching finger to thumb and then releasing on both hands within a threshold amount of time) provides input (e.g., a particular interaction with whatever the user is gazing upon). Another example of a multi-hand gesture involves a user pinching with both hands within a threshold amount of time of one another (e.g., to initiate detection of the gesture) followed by a movement or change to one or both of the hands while the pinching is maintained, e.g., (a) pinching both hands and then moving the hands towards or apart from one another to provide a zoom in or zoom out input, (b) pinching both hands and then moving both hands left, right, up, down, etc. simultaneously and together to provide a panning input in the direction of movement, or (c) pinching both hands and the moving the hands in a way that maintains the distance between hands while changing their relative positioning to provide rotation input based on the change (e.g., as if holding a string between the hands and rotating the string to provide corresponding rotation input to a user interface element).

Multi-hand gestures may involve each hand performing a gesture, for example, by pinching (e.g., touching a pointer or other finger to a thumb), grasping (e.g., forming hand into a ball shape), pointing (e.g., by extending one or more fingers in a particular direction), or performing a multi-finger gesture. In one example, a multi-hand gesture is provided (or initiated) by both hands pinching at the same time, e.g., within a threshold time of one another. In one example, a combined (e.g., multi-hand) gesture is based on the timing between two initiation actions (e.g., pinches performed by each hand) and/or the hands proximity to one another.

Head gestures may involve a movement of the head with respect to a degree of freedom (e.g., translating, rotating, etc.). Head movement may involve, but is not limited to, a head nodding, shaking, or tilting.

User activity may involve user input provided via a device, e.g., a device separate from the HMD or other device that is sensing the user's gaze direction. Such a device may be an input device such as a keyboard, mouse, VR controller, ring, a wearable device such as a watch, a hand-held device such as a phone, tablet, or laptop, or any other type of device capable of interaction or user input.

User activity may involve a user using a hand to interact with a controller or other input device, pressing a hot key, nodding their head, turning their torso, making a facial expression, jumping, sitting, or any other activity performed by a user separate from the user's eye gaze. The activity may be detected based on sensor data (e.g., from an outward facing camera) or based on input device data. The activity may be static, e.g., a user holding a hand steady in a particular configuration, or non-static, e.g., a user making a particular motion such as moving a hand while holding a pinch hand configuration.

Figure 11:
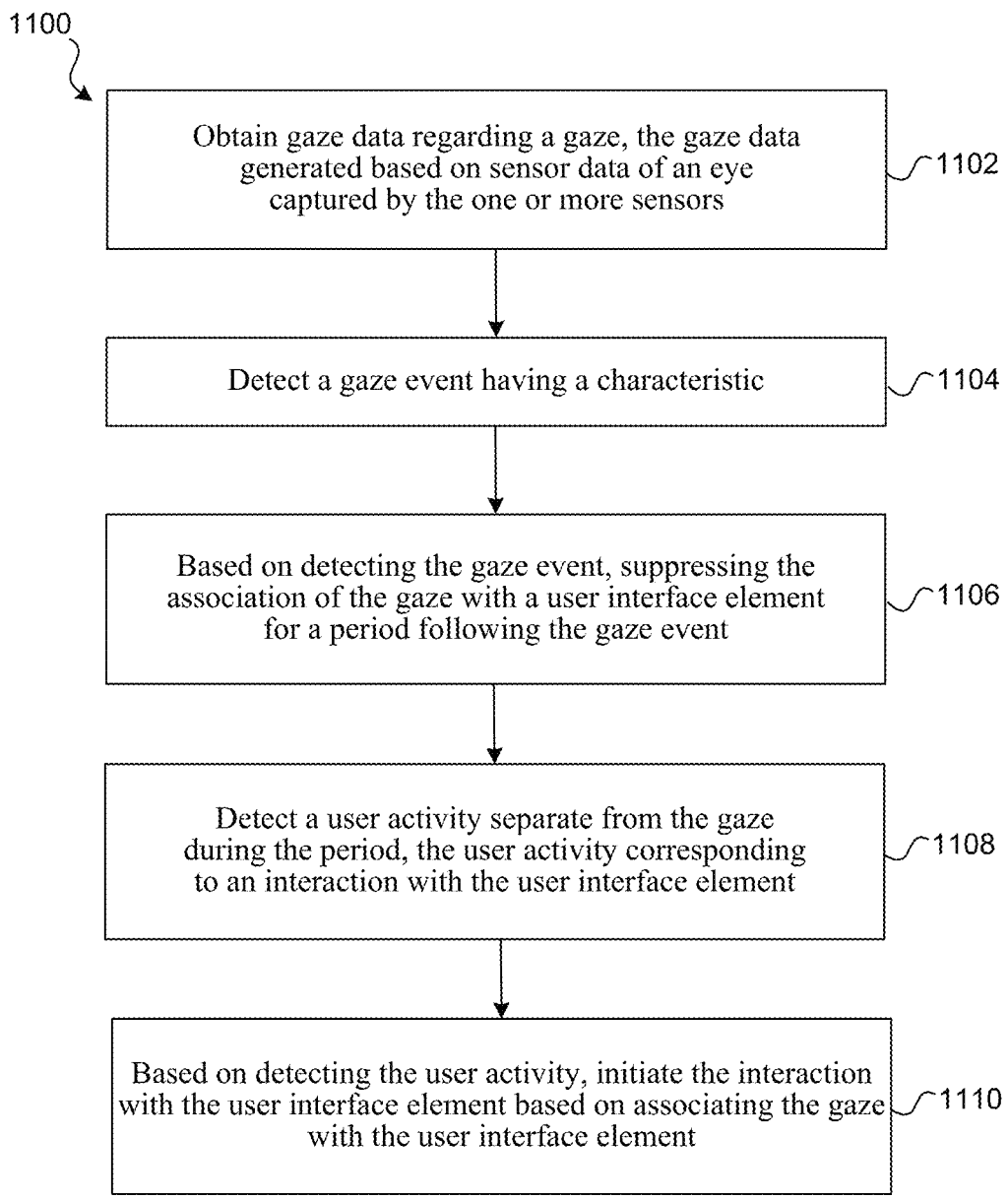
FIG. 11 is a flowchart illustrating a method for breaking through a fast fixation suppression technique, in accordance with some implementations

FIG. 11 is a flowchart illustrating a method 1100 for breaking through a fast fixation suppression technique. In some implementations, a device such as electronic device 105 or electronic device 110 performs method 1100. In some implementations, method 1100 is performed on a mobile device, desktop, laptop, HMD, or server device. The method 1100 is performed by processing logic, including hardware, firmware, software, or a combination thereof. In some implementations, the method 1100 is performed on a processor executing code stored in a non-transitory computer-readable medium (e.g., a memory).

At block 1102, the method 1100 obtains gaze data regarding a gaze, the gaze data generated based on sensor data of an eye captured by the one or more sensors.

At block 1104, the method 1100 detects a gaze event having a characteristic. Detecting the gaze event having the characteristic may involve detecting a saccade. Detecting the gaze event having the characteristic comprises detecting a saccade that exceeds a threshold in distance (e.g., angular distance) or time. Detecting the gaze event having the characteristic may be based on: an amplitude representing velocity change during the gaze event; a rate of change of velocity during the gaze event; a duration of the gaze event; or distance of eye travel during the gaze event.

At block 1106, the method 1100, based on detecting the gaze event, suppresses the association of the gaze with a user interface element for a period following the gaze event. (e.g., fast fixation rejection in which hover is suppressed for fast fixations after large saccades since after large saccades, users tend to be inaccurate and less sensitive to latency). Suppressing the association of the gaze with the user interface element may involve determining to not associate the user interface element with the gaze during the period unless user activity of a type is recognized during the period (e.g., suppress unless/until a pinch occurs, suppress unless/until a hand gesture occurs, suppress unless/until a voice command occurs, suppress unless/until a contact with a touch surface or button of an input device occurs, etc.).

Gaze velocity data may be assessed or filtered in a way that accounts for fast fixation inaccuracies such as those associated with short duration gaze events that occur following significant gaze-shifting/saccadic events. For example, the method may ignore potential gaze events that have a short duration and that follow a gaze shifting/saccadic event in which the gaze has shifted more than a threshold amount or at more than threshold rate (e.g., based on absolute gaze directional change amount or gaze velocity associated with a saccadic event). In some implementations, gaze events that are identified based on gaze velocity exclude potential gaze events occurring during a time period following a saccadic event in the velocity data where the saccadic event has an amplitude greater than a threshold. In some implementations, gaze events that are identified based on gaze velocity exclude potential gaze events occurring during a time period following a saccadic event in the velocity data where the saccadic event has velocity that is greater than a threshold velocity and/or changes at a rate that is greater than a threshold rate of change. Furthermore, in some additional or alternative implementations, gaze events that are identified based on gaze travel exclude potential gaze events occurring during a time period following a saccadic event in the eye tracking data where the saccadic event has a distance of eye travel that is greater than a threshold distance.

Gaze events or portions thereof may be rejected from consideration with respect to providing user interface responses based on various criteria. In some implementations, this involves rejecting the gaze (e.g., a portion of a gaze event) for a period in the beginning of the gaze (and accepting the rest) even when the gaze event might take longer than the rejection period. A user may saccade and land on a target next to their intended target, and then from there drift slowly to the intended target. In this case, the time from landing on the neighbor target and the drifting is rejected, but the portion of the gaze event occurring after landing on the intended target is accepted.

In some implementations, at least a potential gaze event occurring during a time period following a saccadic event is excluded, where potential gaze event is excluded based on (a) an amplitude representing an amount of velocity change during the saccadic event, (b) a rate of change of the velocity during the saccadic event, (c) a duration of the potential gaze event, and/or (d) distance of eye travel during the saccadic event. In some implementations, a potential gaze event is excluded based on it occurring between two saccadic events having one or more particular characteristics such as those described above. For example, in the case where there is a large saccade, a short intermediate gaze event and then another large saccade, the intermediate gaze event may be rejected. In some implementation, a small saccade following one or more large saccades that might be erroneously classified as a gaze event is correctly characterized (i.e., as a small saccade rather than a gaze event) based on determining that it follows a saccadic event having one or more particular characteristics such as those described above. Similarly, a gaze classifier may classify gaze data associated with a continuous saccade by falsely identifying a gap (and thus classifying the second portion of the saccade as a gaze event). Such an erroneous classification may be correctly characterized (e.g., as a saccadic event rather than a gaze event) based on determining that it follows a saccadic event having one or more particular characteristics such as those described above.

Excluding potential gaze events in such circumstances may be beneficial because when a user makes a large eye movement (e.g., a saccade of large amplitude), the eye may not go as quickly to an intended gaze target as in other circumstances. When the eye makes a large eye movement, it often does not land exactly where the user intends, e.g., on an intended user interface target. Often, the eyes naturally land around the general area (not on it exactly) and then move and adjusts to the exact location of the intended user interface element following subsequent gaze event(s). The system may exclude the one or more initial gaze events (e.g., due to velocity, distance of eye travel, time-proximity to a significant gaze shifting event, etc.) following a significant gaze shift (e.g., high-amplitude saccadic event) and interpret a later gaze event as the appropriate gaze event to use to identify gaze direction in a triggered user interface response. Excluding gaze events that occur soon after such large eye movements, may thus help ensure that a gaze event is only used to trigger user interface responses in circumstances in which the gaze event is likely to have a gaze direction that corresponds to an intended gaze target.

However, the method 1110 also detects circumstances in which suppression of such gaze events should be discontinued.

At block 1108, the method 1110 detects a user activity separate from the gaze during the period, the user activity corresponding to an interaction with the user interface element.

At block 1110, the method 1100, based on detecting the user activity, initiating the interaction with the user interface element based on associating the gaze with the user interface element. (e.g., breakthrough to the fixated target; users may not wait for hover feedback when typing or entering a passcode). The user interface element with which the gaze is associated or that is selected may be identified based on a direction of the gaze before the user activity, a direction of the gaze during the user activity, or a direction of the gaze after the user activity.

Target Refinement

Some implementations described herein provide target refinement. In some circumstances, an initially identified gazed-upon UI target may not be the target intended by the user for an interaction. For example, a user may attempt a pinch and gaze interaction and the user's gaze may not have quite reached the intended target when the user pinches. In another example, the gaze during a pinch and gaze interaction may be detected, due to error in the gaze tracking system, to be slightly outside of an intended target. An initial target error may become more evident over time, e.g., as the user's gaze moves to the intended target, as subsequent hand movement is determined to be application for the initial target's type or not, etc.

In some implementations, a pinch and gaze interaction is identified and a first target (to associate with the pinch) is identified based on the gaze at the time of the pinch. The system may identify additional information after the pinch that either confirms the first target association or indicates that the first target association was erroneous, e.g., that the user intended the pinch and gaze interaction to be associated with a second, different target rather than the first target. As a specific example, a user may provide a pinch intending to select a button, but the user's gaze may be detected to be just outside the button when the pinch occurs. Initially, at the time of the pinch, the system may not know whether the pinch just outside of the button was intended to be another type of interaction (e.g., a pinch-based scroll on the background near the button) or a pinch-based selection of the button. The system may initially associate the pinch with the background and then, when more information is available indicating that this association was erroneous, change the association to the button. Such corrections may be appropriate in a relatively common natural circumstance in which a user's eye lands near a target before hopping onto it.

In some implementations, an initial target selection is provided for use in responding to a user interaction, e.g., providing a user interaction event to an application that can use the interaction event to start responding to the user interaction. A correction may then be determined to be appropriate and provided to the application, e.g., by sending a cancellation and new event and/or other correction information, so that the application can correct its response to the user interaction, e.g., in line with the user's intentions. In some implementations, an initial target selection is withheld, e.g., delaying the response to the user interaction, for example, in circumstances in which a user activity could correspond to multiple different target elements.

Figure 12:
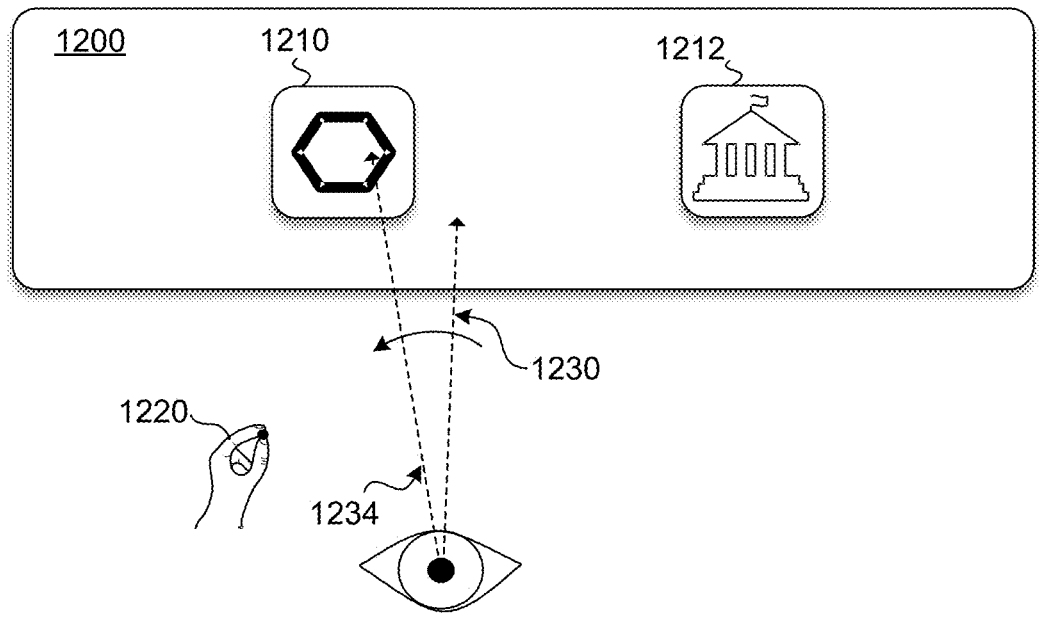
FIG. 12 illustrates parafoveal fixation behavior during a pinch and gaze interaction with a user correction.

FIG. 12 illustrates parafoveal fixation behavior during a pinch and gaze interaction with a user correction. In this example, at the time of pinch 1220, the user gaze 1230 is detected. In this example, the gaze 1230 is directed at UI background 1200. Shortly after the pinch 1220, the user's gaze 1240 is directed at button 1210. In this example, the user intended to pinch while gazing at button 1210. However, the gaze did not quite reach the button 1210 at the time of the pinch 1220, e.g., the user fixated near the target slightly before and during the pinch 1220 before moving the gaze to the intended target. Some implementations account for such subconscious gaze movements, e.g., in which a user's indirect selection misses the intended target, by retargeting to an appropriate target based on assessing one or more criteria. In some implementations, this may enable mitigation to be performed by recognizing missed selections caused by parafoveal fixation and recovering before the user interaction has ended (e.g., after a pinch make event but before a pinch break event).

Some implementations involve one or more of the following steps. A first step involves determining to never retarget in certain circumstances, e.g., when the first target is capable of receiving selection input, e.g., the first target is a button capable of being selected. In some implementations, a user interface is implemented with UI elements having differing capabilities, e.g., some elements such as buttons capable of selection events (e.g., pinch-based selection), some elements such as backgrounds capable of other selection events (e.g., pinch-drag-based scrolls) but not selection events, and/or other areas capable of non-interaction events (e.g., void areas outside of the UI or in undefined regions of the UI). The first step may involve determining to never retarget if the first target is capable of a certain type of interaction, e.g., never retarget away from a button since the button is capable of selection interaction.

The first step may involve identifying that the gaze hit a void or UI element not capable of responding to a selection event and may proceed to step 2 to determine if, and when, to retarget to a different target.

The first step may also assess whether other circumstances, e.g., hand movement following an initial pinch, indicate that retargeting should be rejected. For example, a user's hand movement following a pinch while gazing at a background portion may indicate that the user is likely performing a scroll-type interaction (which the background can respond to) rather than a selection-type interaction (which should be retargeted to a nearby button that is capable of responding to a selection-type interaction). In one example, this involves determining whether a hand motion has or has not exceeded a tap/selection dead-band (i.e., a criterion used to distinguish hand interaction types).

The second step applies a temporal or spatial mitigation. A temporal mitigation may involve recognizing parafoveal fixation behavior and/or user correction, e.g., based on the user's subsequent activity. For example, this may involve determining whether the user's gaze moves from the first target to a second target within a threshold amount of time (e.g., 500 ms). It may involve determining whether such a second target is close to the initial gaze, e.g., within 5 degrees. Using such a distance threshold may be appropriate to account for parafoveal fixations and corrections in which corrections are usually relatively small in distance. Such a threshold may be relaxed to account for other issues, e.g., distraction saccades.

The second step may further determine whether a user correction from a first target to a second target would provide a preferable target, e.g., a target more likely to be associated with a selection action. This may involve determining whether the gaze moves from the void to any target (if so, retarget), from a non-selection-capable target to a selection-capable target (if so, retarget), from a non-selection-capable target to a non-selection-capable target (if so, don't retarget), etc. In some implementations, the algorithm always determines to maintain the initial association with a first target in the circumstance in which the first target is capable of receiving selection-type input.

At the third step, the algorithm redirects to the second target in appropriate circumstances. This may involve recovering an indirect selection by cancelling a first interaction event (e.g., a scroll/placement action on the first target) and providing a second interaction event (e.g., a tap/selection on the second target).

Figure 13:
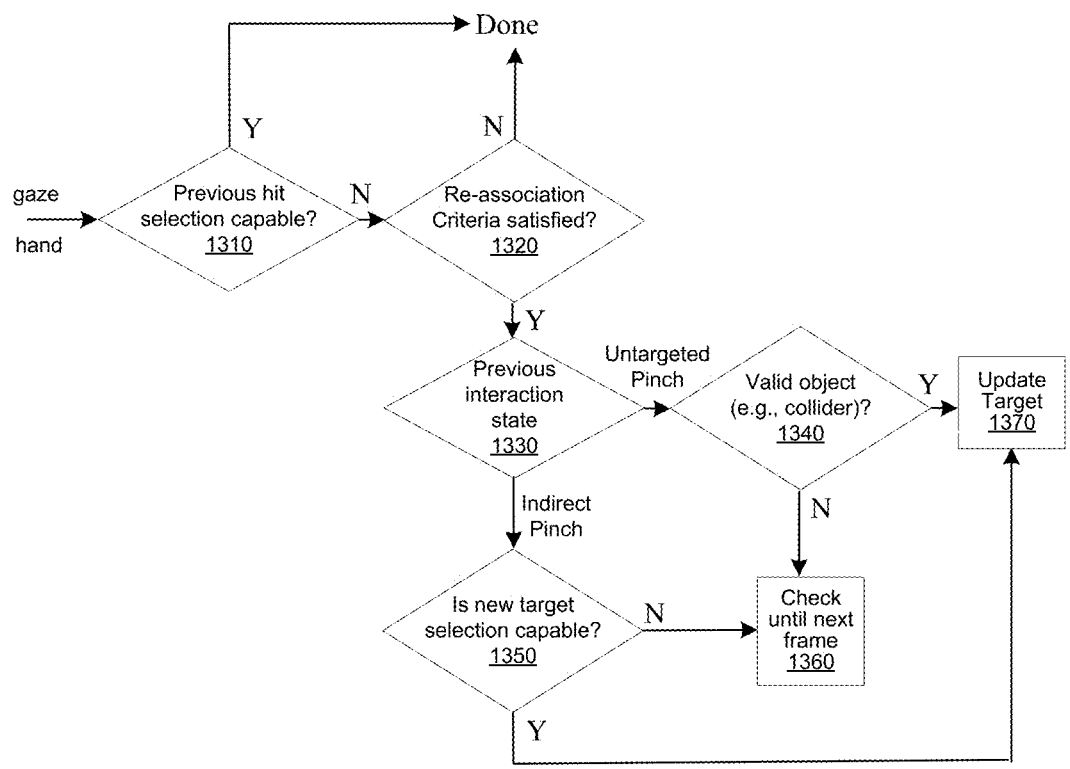
FIG. 13 illustrates an exemplary targeting reassociation algorithm in accordance with some implementations.

FIG. 13 illustrates an exemplary targeting reassociation algorithm. The algorithm uses gaze and hand data. At block 1310, it determines whether the previous hit (i.e., UI element associated with a gaze) is selection capable, e.g., capable of responding to selection-type user interactions. If so, the algorithms is done. If not, at block 1320, the algorithm determines whether re-association (i.e., retargeting) criteria are satisfied, e.g., whether the gaze moves to a better target (e.g., to a selection capable target) within a threshold amount of time and/or other criteria described above. If not, the algorithm is done. If so, at block 1330, the algorithm determines a previous interaction state. If the previous interaction state was an indirect pinch, at block 1350, the algorithm determines whether the new target is selection capable. If so, at block 1370 the algorithm updates the target. If not, at block 1360, the algorithm checks until the next frame.

Returning to block 1330, if the previous interaction state was an untargeted pinch, at block 1340 the algorithm determines whether the new target is a valid object, e.g., a collider versus void. If so, at block 1370 the algorithm updates the target. If not, at block 1360, the algorithm checks until the next frame.

Some implementations provide a spatial mitigation to account for indirect selection retargeting. For example, if after a user activity (e.g., a pinch) no target is identified within a given distance of a gaze location, the distance criteria for the search may be expanded, e.g., expanding the area in which to search for a hit over time. Such a spatial mitigation may be appropriate to account, for example, for the circumstance in which a gaze tracking error results in a user's gaze being detected near but not on an intended target. In some implementations, the distance threshold is expanded based on determining that there is a lone target available for selection. The distance threshold may be expanded initially or increased over time. The area to search may also be configured to account for other factors. For example, if the user's eye behavior after a pinch goes in a particular direction, then the search area may be expanded more in that direction than in other directions, e.g., providing an oval shaped search area rather than a circular search area.

Some implementations prioritize selection interactions over other types of interactions, e.g., when associating user activity that may correspond to either the start of a selection interaction (e.g., a pinch and release selection) or a non-selection interaction (e.g., a pinch and drag scroll). The system may identify a user activity such as a pinch on a non-selection-capable target (e.g., on a background) and use temporal and/or spatial mitigation strategies, as described above, to attempt to retarget the user activity to a selection-capable target (e.g., to a button).

Figure 14:
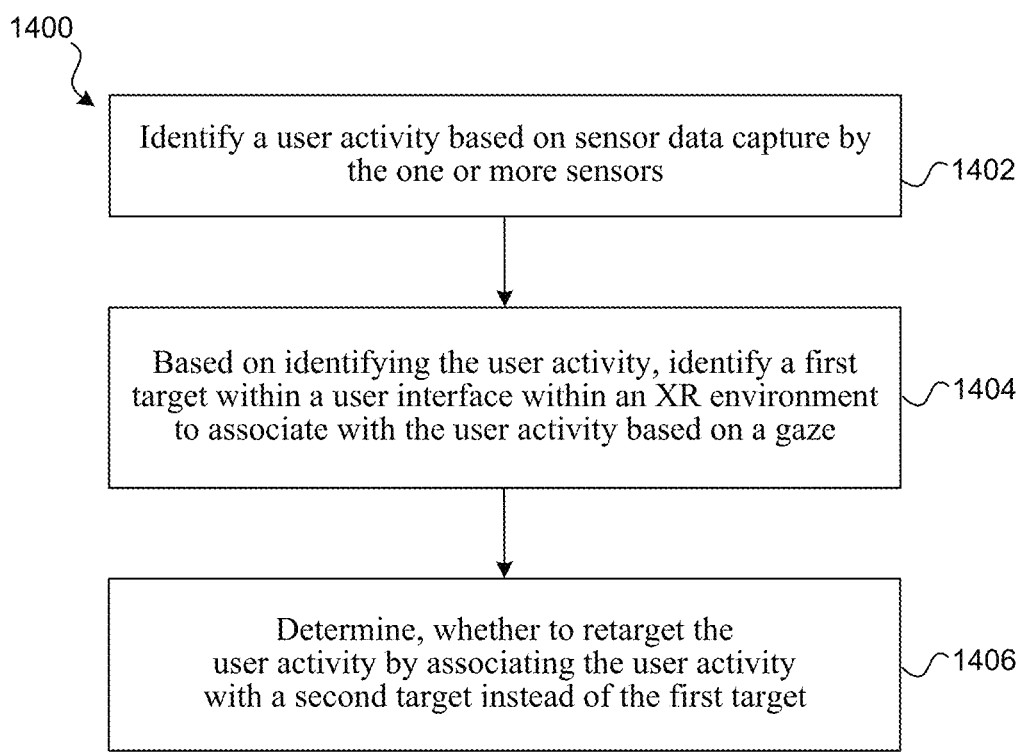
FIG. 14 is a flowchart illustrating a method for determining whether to redirect a user activity to a different target, in accordance with some implementations.

FIG. 14 is a flowchart illustrating a method 1400 for determining whether to redirect a user activity to a different target. In some implementations, a device such as electronic device 105 or electronic device 110 performs method 1400. In some implementations, method 1400 is performed on a mobile device, desktop, laptop, HMD, or server device. The method 1400 is performed by processing logic, including hardware, firmware, software, or a combination thereof. In some implementations, the method 1400 is performed on a processor executing code stored in a non-transitory computer-readable medium (e.g., a memory).

At block 1402, the method 1400 involves identifying a user activity (e.g., a user making a pinch by touching a finger and a thumb together) based on sensor data capture by the one or more sensors. The user activity may be a type of activity associated with a start of a first user interaction (e.g., pinch-release to select) and a start of a second user interaction (e.g., pinch-drag to scroll).

At block 1404, based on identifying the user activity, the method 1400 identifies a first target within a user interface within an XR environment to associate with the user activity based on a gaze. The gaze may be identified based on sensor data of an eye captured by the one or more sensors. In one example, the method what element the user is looking at when a pinch make event is detected.

At block 1406, the method 1400 determines whether to retarget the user activity by associating the user activity with a second target instead of the first target, where determining whether to retarget is based on a first criterion, e.g., applying a temporal mitigation, applying a spatial mitigation, etc.

In some implementations, determining whether to retarget comprises determining to continue associating the user activity with the first target rather than retargeting based on determining that the first target is configured to receive a type of interaction, e.g., effects for the first target specify that that the target will receive selection/pinch-release triggered events and thus retargeting will not apply. In one example, the type of interaction is a pinch and release to select interaction.

In some implementations, determining whether to retarget comprises determining to retarget based on determining that the first target is not configured to receive a type of interaction. In one example, the type of interaction is a pinch and release to select interaction and the first target is configured to receive pinch and drag to scroll interaction.

In some implementations, determining whether to retarget comprises determining to continue associating the user activity with the first target rather than retargeting based on determining that hand motion exceeds a selection zone (e.g., deadband). Satisfying such a criterion may be indicative that the user is likely performing a scroll or placement and thus that retargeting will not be applied.

In some implementations, determining whether to retarget comprises determining to retarget based on identifying parafoveal fixation behavior and a user correction. Determining whether to retarget may comprise determining to retarget based on determining that the gaze moves to the second target within a threshold time of the user activity.

In some implementations, determining whether to retarget comprises determining that movement of the gaze to the second target is less than a threshold distance.

In some implementations, determining whether to retarget comprises determining to retarget based on determining that selection interactions are accepted by the second target but not the first target.

In some implementations, determining whether to retarget comprises determining to retarget based on determining that the second target corresponds to a user interface element and the first target corresponds to a void.

In some implementations, the criterion enforces a temporal mitigation, wherein the method searches for another target having a characteristic lacking in the first target for a limited period of time following the user activity.

In some implementations, the criterion enforces a spatial mitigation, wherein the method searches for another target having a characteristic lacking in the first target following the user activity using search area that increases over time.

In some implementations, the method 1400 further comprises identifying that the first target to an application based on identifying the first target to associate with the user activity based on the gaze and sending a correction identifying the second target to the application based on determining to retarget the user activity.

In some implementations, the method 1400 further comprises determining to delay identifying the first target to an application and after determining whether to retarget the user activity, identifying one of the first target or the second target to the application.

Figure 15:
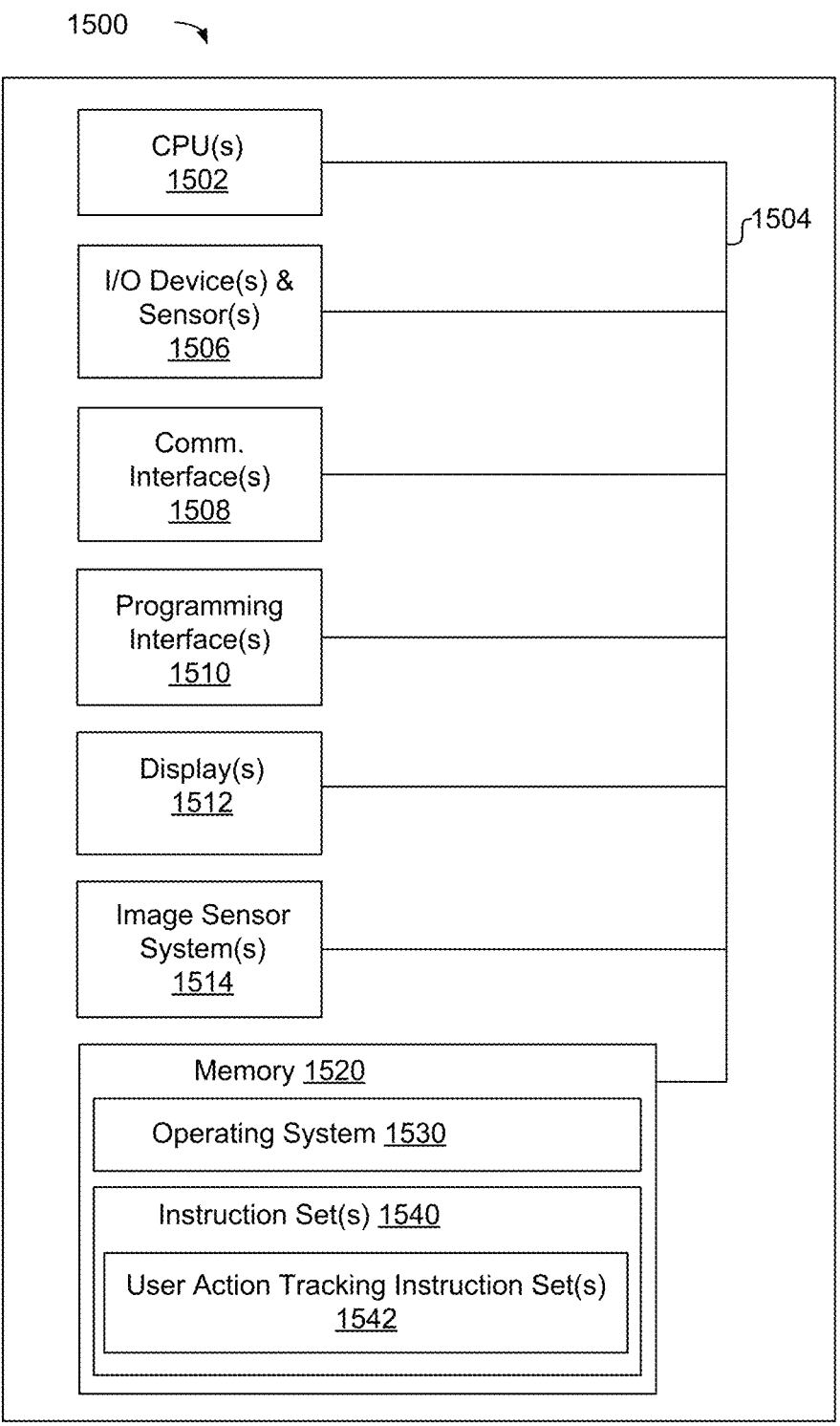
FIG. 15 is a block diagram of an electronic device of in accordance with some implementations.

FIG. 15 is a block diagram of electronic device 1500. Device 1500 illustrates an exemplary device configuration for electronic device 105 or electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1500 includes one or more processing units 1502 (e.g., microprocessors, ASICs, FPGAs, GPUs, CPUs, processing cores, and/or the like), one or more input/output (I/O) devices and sensors 1506, one or more communication interfaces 1508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1510, one or more output device(s) 1512, one or more interior and/or exterior facing image sensor systems 1514, a memory 1520, and one or more communication buses 1504 for interconnecting these and various other components.

In some implementations, the one or more communication buses 1504 include circuitry that interconnects and controls communications between system components. In some implementations, the one or more I/O devices and sensors 1506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1512 include one or more displays configured to present a view of a 3D environment to the user. In some implementations, the one or more displays 1512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1500 includes a single display. In another example, the device 1500 includes a display for each eye of the user.

In some implementations, the one or more output device(s) 1512 include one or more audio producing devices. In some implementations, the one or more output device(s) 1512 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1512 may additionally or alternatively be configured to generate haptics.

In some implementations, the one or more image sensor systems 1514 are configured to obtain image data that corresponds to at least a portion of a physical environment. For example, the one or more image sensor systems 1514 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1514 further include illumination sources that emit light, such as a flash. In various implementations, the one or more image sensor systems 1514 further include an on-camera image signal processor (ISP) configured to execute a plurality of processing operations on the image data.

The memory 1520 includes high-speed random-access memory, such as DRAM, SRAM, DDR RAM, or other random-access solid-state memory devices. In some implementations, the memory 1520 includes non-volatile memory, such as one or more magnetic disk storage devices, optical disk storage devices, flash memory devices, or other non-volatile solid-state storage devices. The memory 1520 optionally includes one or more storage devices remotely located from the one or more processing units 1502. The memory 1520 comprises a non-transitory computer readable storage medium.

In some implementations, the memory 1520 or the non-transitory computer readable storage medium of the memory 1520 stores an optional operating system 1530 and one or more instruction set(s) 1540. The operating system 1530 includes procedures for handling various basic system services and for performing hardware dependent tasks. In some implementations, the instruction set(s) 1540 include executable software defined by binary information stored in the form of electrical charge. In some implementations, the instruction set(s) 1540 are software that is executable by the one or more processing units 1502 to carry out one or more of the techniques described herein.

The instruction set(s) 1540 include user action tracking instruction set(s) 1542 configured to, upon execution, interpret user activity as described herein. The instruction set(s) 1540 may be embodied as a single software executable or multiple software executables.

Although the instruction set(s) 1540 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor and one or more sensors:
      obtaining gaze data regarding a gaze, the gaze data generated based on sensor data of an eye captured by the one or more sensors;
      generating an association between the gaze and a user interface element;
      detecting that the gaze is outside of a region associated with the user interface element;

initially maintaining the association between the gaze and the user interface element when the gaze is detected outside of the region associated with the user interface element; and discontinuing the association between the gaze and the user interface element based on determining that a criterion is satisfied based on the gaze being detected fixed for a number of frames outside of the region.

2. The method of claim 1 further comprising displaying hover feedback for the user interface element based on the association between the gaze and the user interface element.

3. The method of claim 1 further comprising displaying a menu expansion associated with the user interface element based on the association between the gaze and the user interface element.

4. The method of claim 1, wherein the method determines that the criterion is satisfied by determining that the gaze is outside of the region associated with the user interface element for a threshold number of frames.

5. The method of claim 1, wherein the region associated with the user interface element is determined based on a control region associated with the user interface element.

6. The method of claim 1, wherein the region associated with the user interface element is determined based on a control region associated with the user interface element and additional area around the control region.

7. The method of claim 1, wherein the method determines that the criterion is satisfied by:
  on every frame that the gaze is determined to be fixated, computing a distance (e.g., angular) from the raw gaze to a bounds of the user interface element;
  determining if the distance is greater than a threshold distance;
  tracking a number of frames that the distance is greater than the threshold; and
  determining the criterion is satisfied when the tracked number of frames exceeds a threshold number of frames.

8. The method of claim 7, wherein the tracked number of frames is reset if the gaze returns to the region associated with the user interface element.

9. The method of claim 1, wherein the association between the gaze and the user interface element is maintained initially based on:
  detecting an event having a characteristic; and
  maintaining the association between the gaze and the user interface element for a time period following the event unless the criterion is satisfied by the gaze detected outside of the region.

10. The method of claim 9, wherein the event is detected based on:
  (a) an amplitude representing velocity change during the event;
  (b) a rate of change of velocity during the event;
  (c) a duration of the event; or
  (d) distance of eye travel during the event.

11. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
  obtaining gaze data regarding a gaze, the gaze data generated based on sensor data of an eye captured by one or more sensors;
  generating an association between the gaze and a user interface element;
  detecting that the gaze is outside of a region associated with the user interface element;
  initially maintaining the association between the gaze and the user interface element when the gaze is detected outside of the region associated with the user interface element; and
  discontinuing the association between the gaze and the user interface element based on determining that a criterion is satisfied based on the gaze being detected fixed for a number of frames outside of the region.

12. The system of claim 11, wherein the operations further comprise displaying hover feedback for the user interface element based on the association between the gaze and the user interface element.

13. The system of claim 12, wherein the operations further comprise displaying a menu expansion associated with the user interface element based on the association between the gaze and the user interface element.

14. The system of claim 11, wherein the criterion is determined to be satisfied based on determining that the gaze is outside of the region associated with the user interface element for a threshold number of frames.

15. The system of claim 11, wherein the region associated with the user interface element is determined based on a control region associated with the user interface element.

16. The system of claim 11, wherein the region associated with the user interface element is determined based on a control region associated with the user interface element and additional area around the control region.

17. The system of claim 11, wherein the criterion is determined to be satisfied by:
  on every frame that the gaze is determined to be fixated, computing a distance (e.g., angular) from the raw gaze to a bounds of the user interface element;
  determining if the distance is greater than a threshold distance;
  tracking a number of frames that the distance is greater than the threshold; and
  determining the criterion is satisfied when the tracked number of frames exceeds a threshold number of frames.

18. The system of claim 17, wherein the tracked number of frames is reset if the gaze returns to the region associated with the user interface element.

19. The system of claim 11, wherein the association between the gaze and the user interface element is maintained initially based on:
  detecting an event having a characteristic; and
  maintaining the association between the gaze and the user interface element for a time period following the event unless the criterion is satisfied by the gaze detected outside of the region.

20. A non-transitory computer-readable storage medium storing program instructions executable via one or more processors to perform operations comprising:
  obtaining gaze data regarding a gaze, the gaze data generated based on sensor data of an eye captured by one or more sensors;
  generating an association between the gaze and a user interface element;
  detecting that the gaze is outside of a region associated with the user interface element;

initially maintaining the association between the gaze and the user interface element when the gaze is detected outside of the region associated with the user interface element; and discontinuing the association between the gaze and the user interface element based on determining that a criterion is satisfied based on the gaze being detected fixed for a number of frames outside of the region.

\* \* \* \* \*